United States Patent
Lokanath

(10) Patent No.: US 11,538,006 B2
(45) Date of Patent: Dec. 27, 2022

(54) SYSTEMS, METHODS, AND APPARATUSES FOR CONDUCTING TRANSACTIONS BETWEEN BOTS USING DISTRIBUTED LEDGER TECHNOLOGY IN A CLOUD BASED COMPUTING ENVIRONMENT

(71) Applicant: salesforce.com, inc., San Francisco, CA (US)

(72) Inventor: Savithru Mallikarjuna Durga Lokanath, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 229 days.

(21) Appl. No.: 16/779,518

(22) Filed: Jan. 31, 2020

(65) Prior Publication Data

US 2021/0241241 A1 Aug. 5, 2021

(51) Int. Cl.
*G06Q 20/40* (2012.01)
*G06Q 20/10* (2012.01)
(Continued)

(52) U.S. Cl.
CPC ..... *G06Q 20/102* (2013.01); *G06F 16/90332* (2019.01); *G06Q 20/405* (2013.01); *H04L 9/0637* (2013.01); *H04L 51/02* (2013.01)

(58) Field of Classification Search
None
See application file for complete search history.

(56) References Cited

U.S. PATENT DOCUMENTS 7,328,841 B1 * 2/2008 Frenklakh ............ G06Q 20/385 235/379
11,107,141 B1 * 8/2021 Nagarajappa .......... G06Q 20/02
(Continued)

FOREIGN PATENT DOCUMENTS

EP 3706383 A1 * 9/2020 ........... H04L 63/108

OTHER PUBLICATIONS

Seed Token, "Seed Bot is the First Chatbot to Log Transactions to Blockchain", Medium.com, Aug. 7, 2018. (Year: 2018).*

*Primary Examiner* — Abdulmajeed Aziz
(74) *Attorney, Agent, or Firm* — Elliott, Ostrander & Preston, P.C.

(57) ABSTRACT

Described herein are means for conducting transactions between bots using Distributed Ledger Technology (DLT) in a cloud based computing environment. According to a particular embodiment, there is a system having at least a processor and a memory therein, in which the system is configurable with means for: operating, by a cloud service provider, an interface to a blockchain, in which each bot is a node on the blockchain; posting a transaction request to a chat log by one of the plurality of bots or an administrator; writing the transaction request, and an identification of the one of the plurality of bots or the administrator requesting the transaction, to the blockchain; negotiating consensus among the plurality of bots as nodes on the blockchain to conduct the requested transaction; and when consensus is reached: writing the transaction to the blockchain; pulling the transaction request from the chat log by one of the plurality of bots; and conducting the transaction by the one of the plurality of bots that pulled the transaction request from the chat log; and posting completion of the transaction to the chat log by the one of the plurality of bots that conducted the transaction. Other related embodiments are disclosed.

18 Claims, 16 Drawing Sheets

(51) Int. Cl.
  *H04L 9/06*      (2006.01)
  *H04L 51/02*     (2022.01)
  *G06F 16/9032*   (2019.01)

(56) References Cited

U.S. PATENT DOCUMENTS

2018/0349207 A1* 12/2018 Erickson ............... G06F 40/263
2019/0334905 A1* 10/2019 Lelcuk ................. G06Q 20/381
2020/0169554 A1*  5/2020 Trim .................... H04L 63/14
2020/0213251 A1*  7/2020 Shah .................... G06N 20/00

* cited by examiner

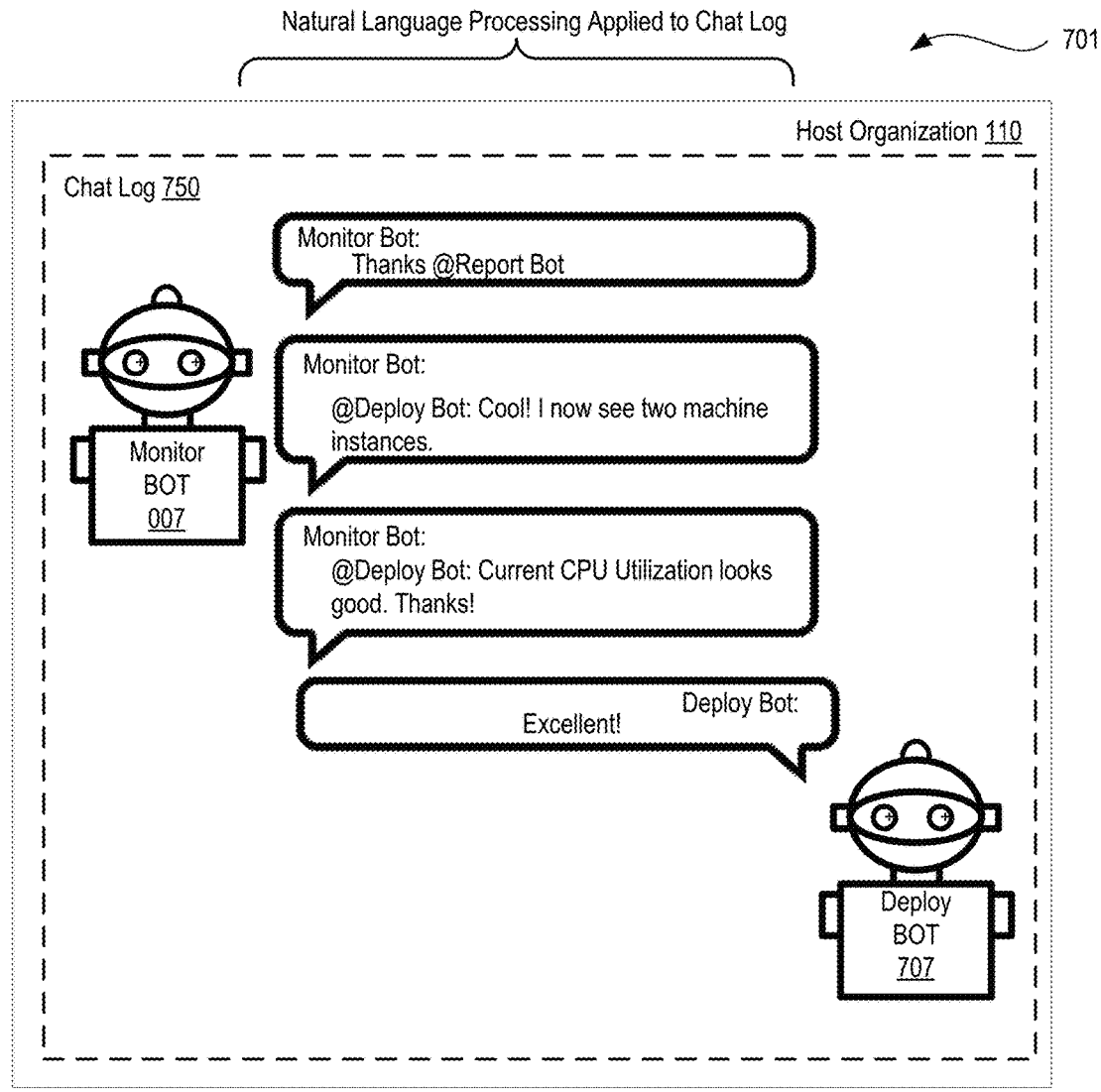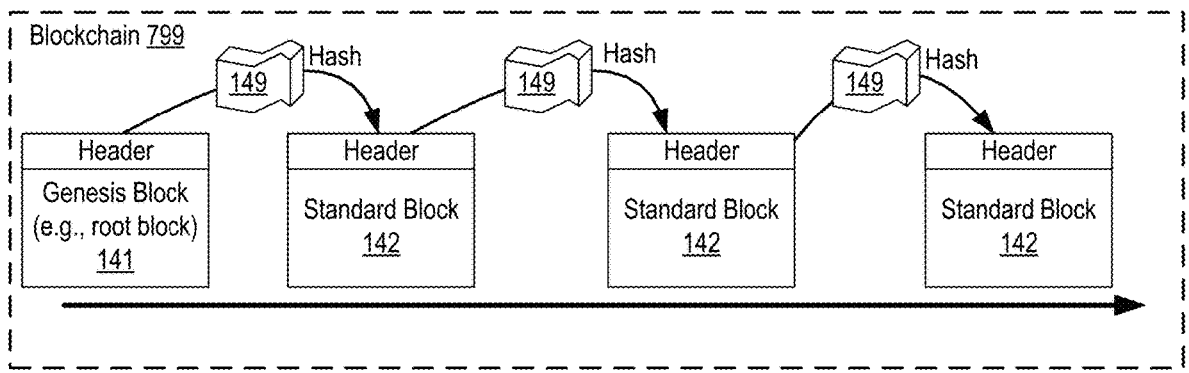
FIG. 7C

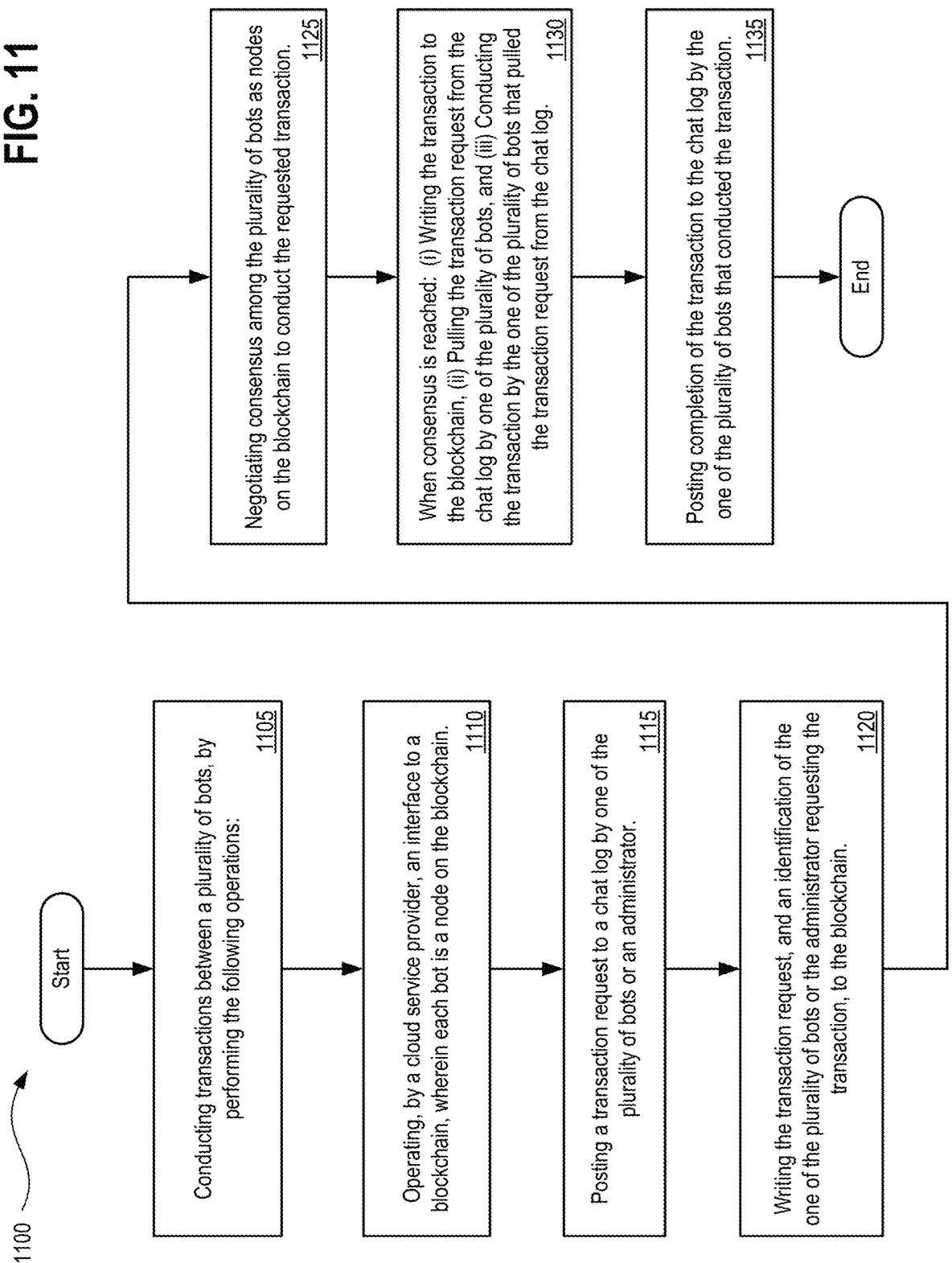

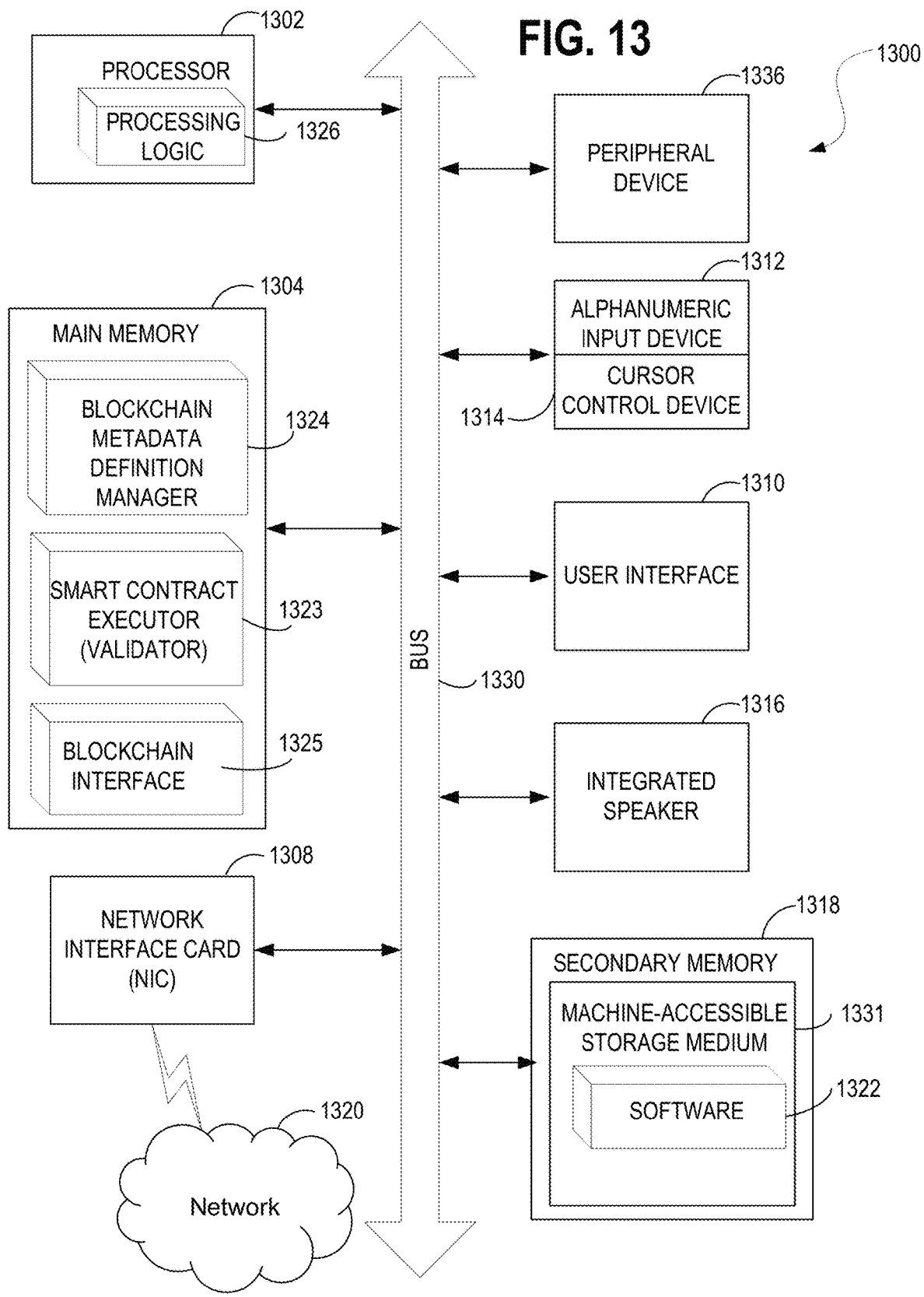

US 11,538,006 B2

SYSTEMS, METHODS, AND APPARATUSES FOR CONDUCTING TRANSACTIONS BETWEEN BOTS USING DISTRIBUTED LEDGER TECHNOLOGY IN A CLOUD BASED COMPUTING ENVIRONMENT

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology and API gateways or platforms. More particularly, disclosed embodiments relate to systems, methods, and apparatuses for conducting transactions between bots using Distributed Ledger Technology (DLT) in a cloud based computing environment.

BACKGROUND

The subject matter discussed in the background section should not be considered prior art merely because of its mention in the background section. Similarly, a problem mentioned in the background section or associated with the subject matter of the background section should not be considered to have been previously recognized in the prior art.

In modern financial systems, assets such as currencies, or securities, are typically held and traded electronically. Transferring assets often requires point-to-point interaction between multiple intermediaries, and reconciliation of duplicated ledgers. This system has some disadvantages, such as the time required for settlement of asset transfers or payments, which often takes days, transfers involve fee payments to multiple intermediaries, and reconciliation can involve expensive overhead, it may be difficult to find out the status of a pending transfer or the current owner of an asset, transfers may not complete, and it may be difficult to make one transfer conditional on another, the complexity of the such systems makes it difficult to prevent fraud or theft, and, whether transactions are reversible depends on the transfer mechanism, rather than the business requirements of the transacting party.

Many of these problems can be fixed if asset ownership were recorded on a single shared ledger. However, a combination of practical and technological constraints have made such ledgers difficult to adopt. Such a shared ledger would tend to require trust in a single party. That party would need to have the technical capacity to process every transaction in real time. Additionally, to address the disadvantages discussed above, the ledger would need to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and its virtual machine has only limited support for custom programs that determine asset movement, sometimes called smart contracts.

Ethereum, introduced in 2015, generalizes the concept of a blockchain to a fully programmable state replication mechanism. While it includes a much more powerful programming language, it presents additional challenges for scalability and efficiency.

In contrast to Bitcoin and Ethereum, which are designed to operate on the public Internet, most financial activity already occurs within restricted networks of financial institutions. A shared ledger operated within this network can take advantage of blockchain technology without sacrificing the efficiency, security, privacy, and flexibility needed by institutions, financial or otherwise.

The present state of the art may therefore benefit from the systems, methods, and apparatuses for conducting transactions between bots using Distributed Ledger Technology (DLT) in a cloud based computing environment, as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 7C depicts further details relating to the exemplary natural language chat log conversation between bots, in accordance with described embodiments;

FIG. 11 depicts a flow diagram illustrating a method for conducting transactions between bots using Distributed Ledger Technology (DLT) in a cloud based computing environment in accordance with described embodiments;

FIG. 13 illustrates a diagrammatic representation of a machine in the exemplary form of a computer system, in accordance with one embodiment.

DETAILED DESCRIPTION

Figure 1:
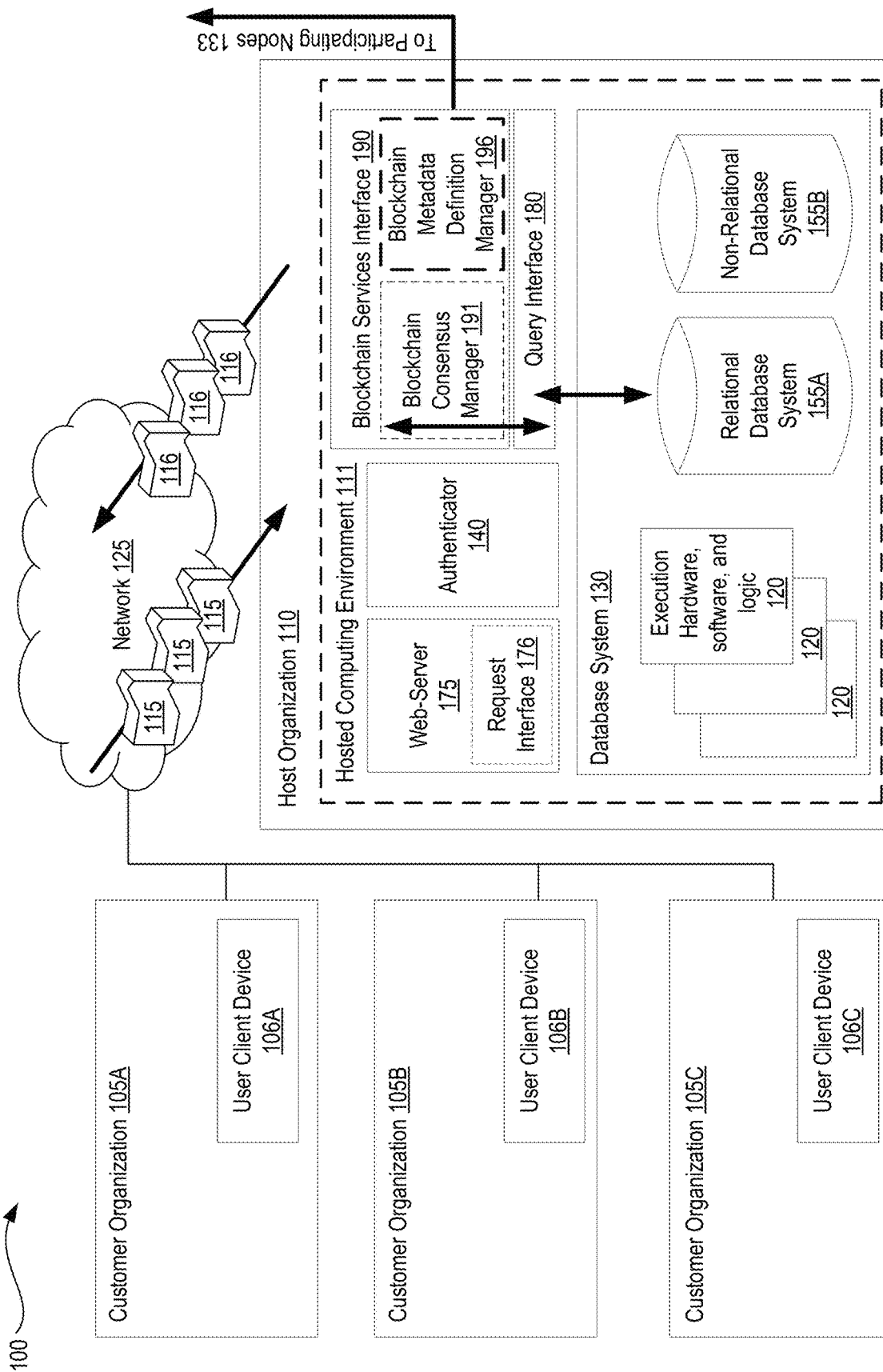
FIG. 1 depicts an exemplary architecture in accordance with described embodiments.

Described herein are systems, methods, and apparatuses for conducting transactions between bots using Distributed Ledger Technology (DLT) in a cloud based computing environment.

For instance, according to one embodiment, there is a method performed by a system having at least a processor and a memory therein and operates within a host organization. According to such an embodiment, the system is specially configurable to perform operations including: operating, by a cloud service provider, an interface to a blockchain, in which each bot is a node on the blockchain; posting a transaction request to a chat log by one of the plurality of bots or an administrator; writing the transaction request, and an identification of the one of the plurality of bots or the administrator requesting the transaction, to the blockchain; negotiating consensus among the plurality of bots as nodes on the blockchain to conduct the requested transaction; and when consensus is reached: writing the transaction to the blockchain; pulling the transaction request from the chat log by one of the plurality of bots; and conducting the transaction by the one of the plurality of bots that pulled the transaction request from the chat log; and posting completion of the transaction to the chat log by the one of the plurality of bots that conducted the transaction.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments.

In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface 180. The hardware, software, and logic elements 120 of the database system 130 are separate and distinct from the customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155A and 155B or the query interface 180, pursuant to which results 116 are then returned to an originator or requestor, such as a user of one of a user client device 106A-C at a customer organization 105A-C.

In one embodiment, each customer organization 105A-C may be a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

Certain requests 115 received at the host organization may be directed toward a blockchain for which the blockchain services interface 190 of the host organization 110 operates as an intermediary.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155A and 155B for processing search queries, or into the other available data stores of the host organization's computing environment 111. In one embodiment, the query interface 180 implements an Application Programming Interface (API) through which queries may be executed against the databases 155A and 155B or the other data stores.

Additionally, the query interface 180 provides interoperability with the blockchain services interface 190, thus permitting the host organization 110 to conduct transactions with either the database system 130 via the query interface 180 or to transact blockchain transactions onto a connected blockchain for which the host organization 110 is a participating node or is in communication with the participating nodes 133, or the host organization 110 may conduct transactions involving both data persisted by the database system 130 (accessible via the query interface 180) and involving data persisted by a connected blockchain (e.g., accessible from a participating node 133 or from a connected blockchain directly, where the host organization operates a participating node on such a blockchain).

In certain embodiments, the Application Programming Interface (API) of the query interface 180 provides an API model through which programmers, developers, and administrators may interact with the blockchain services interface 190 or the database system 130, or both, as the needs and particular requirements of the API caller dictate.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 and a block validator 192. Blockchain services interface 190 communicatively interfaces the host organization 110 with other participating nodes 133 (e.g., via the network 125) so as to enable the host organization 110 to participate in available blockchain protocols by acting as a blockchain protocol compliant node so as to permit the host organization 110 to access information within such a blockchain as well as enabling the host organization 110 to provide blockchain services to other participating nodes 133 for any number of blockchain protocols supported by, and offered to customers and subscribers by the host organization 110. In other embodiments, the host organization merely operates as a participating node so as to enable the host organization 110 to interact with the blockchain protocol(s) provided by others.

The blockchain consensus manager 191 facilitates consensus management for private and public blockchains upon which tenants, customer organizations, or the host organization 110 operates as a participating node on a supported blockchain. Additionally depicted is the blockchain metadata definition manager 196, which enables the blockchain services interface 190 to define and create metadata which is then pushed to and transacted onto a blockchain which is interfaced via the blockchain services interface 190.

For instance, via the blockchain metadata definition manager 196, it is possible to for any customer organization 105A-C of the host organization to define and create metadata which is then recorded or transacted onto the blockchain for use by that customer organization 105A-C and for use by other participating nodes on the blockchain, regardless of whether or not those participating nodes 133 are also customer organizations 105A-C with the host organization 110.

For example, once metadata is defined and created via the blockchain metadata definition manager 196 and pushed onto the blockchain, any participating node 133 with access to the blockchain where that metadata definition resides can then create data records and store information onto the blockchain which adopts the defined metadata definition and thus complies with the newly created metadata definition. In such a way, all participating nodes can utilize information which is stored in compliance with the newly created metadata definition, as there is a standardized and customized manner for storing such data.

In further embodiments, a permissions manager 181 operates to enforce access controls and privileges as defined in metadata for data stored in the blockchain. The permissions manager 181 can enforce restrictions on accessing records, objects, fields, or similar levels of granularity on access control including read and write access controls. The permissions manager 181 enforces management of the blockchain data based on metadata defining access privileges.

The access privileges utilize a unique user identifier (UUID) or similar entity identifier. The metadata can define a list of entities with permission to read or write data in the blockchain. The metadata can also define a set of owners that control the consensus on read process that is utilized to manage the access to access controlled information. In some embodiments, the permissions manager 181 implement a right to forget process (e.g., in compliance with European Union general data protection regulation (GDPR)) or similar process to 'erase' data from the blockchain.

According to certain embodiments, the blockchain metadata definition manager 196 additionally permits non-subscribers (e.g., entities which are not customer organizations 105A-C) of the host organization to nevertheless utilize the blockchain metadata definition manager 196 and graphical user interfaces (GUIs) associated with the blockchain metadata definition manager 196 via an exposed API interface for such non-subscribing customers which may then create and define metadata definitions which are then pushed onto the blockchain via the host organization's blockchain services interface 190.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high *Byzantine* fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 133 for a particular blockchain protocol within a decentralized system has a copy of the blockchain for that specific blockchain protocol. Data quality is maintained by massive database replication and computational trust. Generally speaking, no centralized official copy of the database exists and, by default, no user and none of the participating nodes 133 are trusted more than any other. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. The concept of permissioned verifiers is separate and distinct from the permissioned access control processes described herein. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless, of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is generally needed, although as discussed herein, the embodiments provide for a blockchain access control for particular cases that are applicable to permissioned or public blockchains. This means that applications may be added to the network without the approval or trust of others, using the blockchain as a transport layer. Conversely, permissioned (e.g., private) blockchains use an access control layer to govern who has access to the network. The embodiments further provide access controls for entities within or external to a private or public blockchain. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 2:
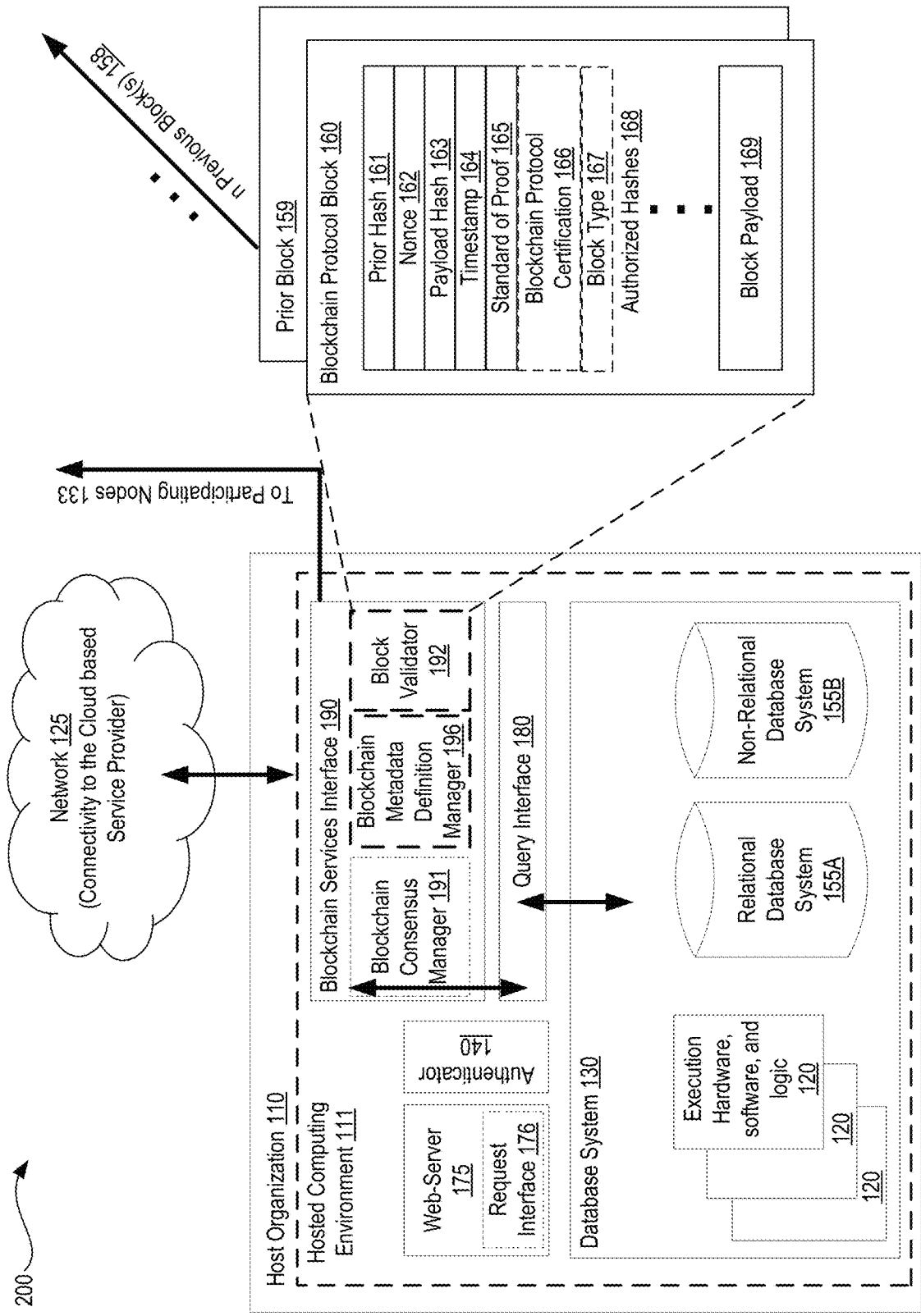
FIG. 2 depicts another exemplary architecture, with additional detail of a blockchain protocol block operating in conjunction with a block validator, in accordance with described embodiments.

FIG. 2 depicts another exemplary architecture 200, with additional detail of a blockchain protocol block 160 operating in conjunction with a block validator 192, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 are organized.

According to certain embodiments, blockchain metadata definition manager 196 as shown here may utilize a specific blockchain implementation which is provided by the host organization 110 and thus, for which the applicable blockchain protocol is defined by the host organization 110. Alternatively, the blockchain metadata definition manager 196 may utilize any publicly accessible blockchain for which the host organization operates as a participating node so as to establish access or the blockchain metadata definition manager 196 may utilize a private blockchain, including those which are not provided by the host organization 110, so long as the host organization is able to authenticate with such a private blockchain and access the blockchain by operating as a participating node on the private blockchain.

As will be described in greater detail below, the blockchain metadata definition manager 196 implements a specialized metadata definition and creation scheme which may include the use of GUIs and other user-friendly interfaces which are provided by the host organization either via an API or via an interface of the host organization, such as the web-server 175 via which users and customer organizations may interact with the host organization and more particularly, with the services and applications provided by the host organization, including use of GUIs provided by the blockchain metadata definition manager 196 which is made accessible to tenants of the host organization via the cloud computing platform and in certain embodiments made available to non-tenants and non-subscribers of the host organization 110, either of which may then utilize the GUIs and functionality provided by the blockchain metadata definition manager 196.

It may be necessary in accordance with certain embodiments that a customized blockchain protocol implementation be provided by the host organization to support use of the specialized metadata definition and creation scheme as implemented by the blockchain metadata definition manager 196. However, in other embodiments where the metadata is permissibly defined and stored onto a blockchain by the host organization 110, any blockchain utilized to store such data will be unaffected because such blockchains are agnostic as to what types of metadata is defined or created and transacted onto the blockchain by the host organization. Stated differently, while the host organization 110 facilitates the definition and creation of such metadata and transacts that information onto a blockchain, it is immaterial to the blockchain as to what applications elect to utilize such data, whereas the host organization facilitates a platform in which applications may elect to only utilize data which is in compliance with the defined and created metadata, thus permitting transferability of such data, as well as many other benefits. For instance, other non-compliant applications may store data in a non-compliant format, but the applications which comply with the formatting requirements and utilize the metadata defined and stored on the blockchain will simply have the benefit of data interoperability. This will be true regardless of whether the applications are utilizing a blockchain established by the host organization or whether the applications are utilizing some public or private blockchain not established by the host organization, but for which the applications have the ability to access such a blockchain via the host organizations' blockchain services interface 190 in the manner described above.

With respect to the blockchain protocol 160 (regardless of whether it is an existing and already available blockchain protocol or a custom implemented blockchain protocol), the prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 163 provides a hash of the data stored within the block payload 169 portion of the blockchain protocol block 160 and need not meet any specific standard of proof 165. However, the payload hash is included as part of the input when the hash is calculated for the purpose of storing it as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a timestamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized to store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standards of proof 165 may be utilized pursuant to the particular blockchain protocol chosen, such as proof of work, hash value requirements, proof of stake, a key, or some other indicator such as a consensus, or proof of consensus. Where consensus based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may all be of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

Figure 3:
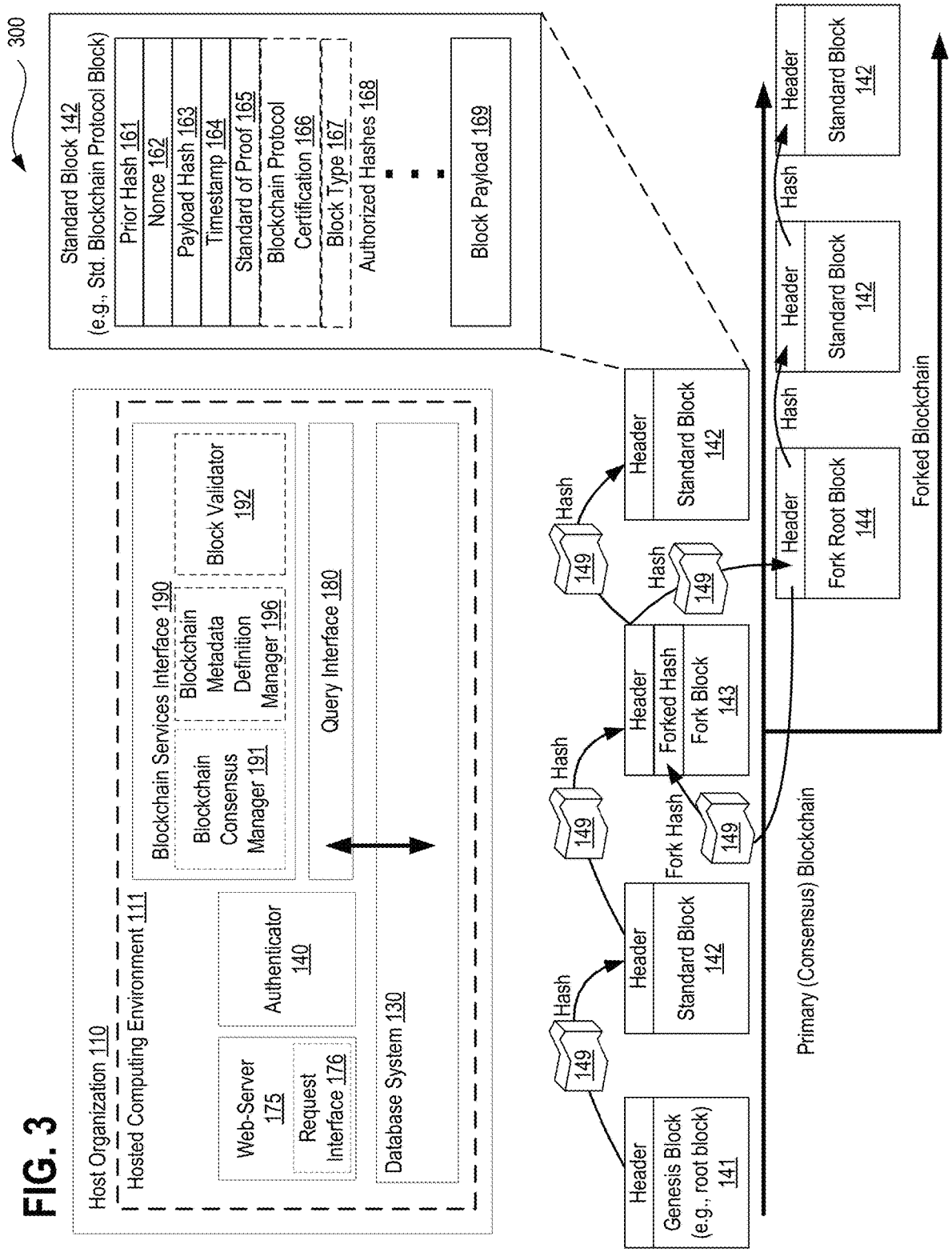
FIG. 3 depicts another exemplary architecture, with additional detail of a blockchain and a forked blockchain, in accordance with described embodiments.

FIG. 3 depicts another exemplary architecture 300, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary block chain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing and potentially valid primary blockchains. Once consensus is reached (typically after one or two cycles of new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

For instance, a forked blockchain may be utilized to support declarative smart actions as enabled by the host organization where a forked blockchain of a public or private blockchain is customized via a new blockchain protocol certification 166 to support both the declarative establishment of smart actions and their required information capture provisions as defined by an administrator as well as the ability to map the data captured with a transaction utilizing such a declared smart action back to the cloud platform entity as provided by the host organization.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which declared smart actions for assets, tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

Consider for instance the host organization's use of a previously existing blockchain for the implementation of the services provided by the blockchain metadata definition manager 196. It may be advantageous to utilize an existing blockchain, but then creating a specialized sidechain or a forked blockchain specifically for the services provided by blockchain metadata definition manager 196 yet remain in compliance with the blockchain protocol certification 166 required by the primary (consensus) blockchain.

In other instances, a modified Distributed Ledger Technology (DLT) ledger may be utilized which is a hosted ledger fully under the control of the host organization, and as such, it may not be necessary to side-chain from a primary chain. Still other examples may include the host organization providing and defining the blockchain protocol for a public blockchain, in which case the host organization may define the blockchain protocol utilized in such a way that the extended capabilities of the blockchain metadata definition manager 196 (see e.g., FIG. 1) are native to the protocol, thus requiring no side-chaining or conversely, the host organization may define and operate a public blockchain which has a limited sub-set of functionality available to the public and then extend the capabilities of the blockchain metadata definition manager 196 by side-chaining off of the public blockchain to provide the enhanced functionality.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C#, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

Figure 4:
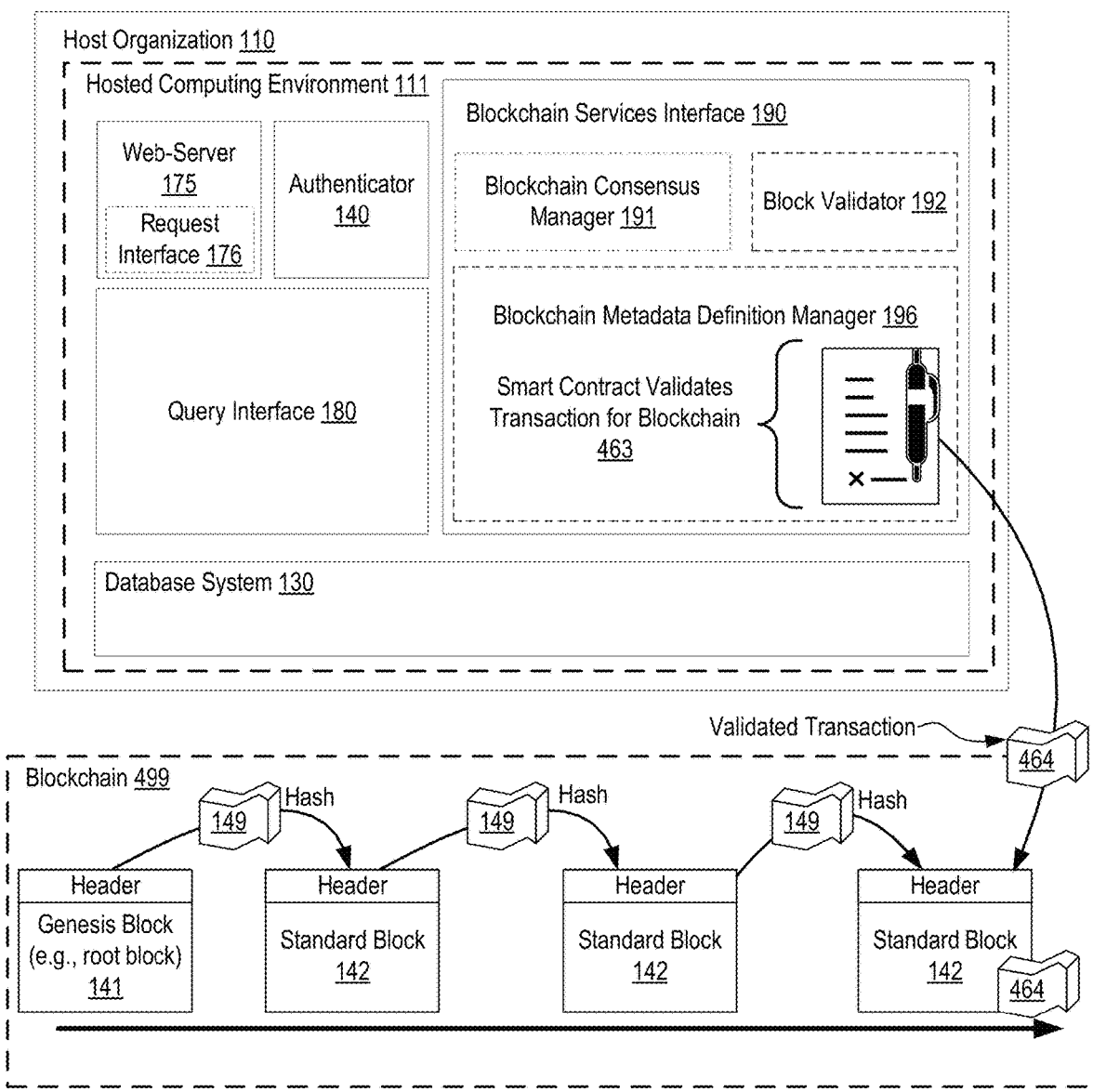
FIG. 4 depicts another exemplary architecture in accordance with described embodiments.

FIG. 4 depicts another exemplary architecture 400 in accordance with described embodiments.

According to one embodiment, the blockchain metadata definition manager 196 writes data or metadata onto a blockchain by transacting an asset to the blockchain or adding an asset to the blockchain via a new transaction with the blockchain. According to a particular embodiment, the transaction has a specific transaction type, for instance, defined as a blockchain storage transaction type, which triggers execution of a smart contract to perform validation of the transaction and specifically to perform validation of the data or metadata within the asset being added to or transacted onto the blockchain.

For example, such a smart contract 463 may execute via the host organization's blockchain services interface 190 which performs the validation and then transacts the new asset onto the blockchain pursuant to successful validation of the data or metadata within the asset being stored on the blockchain. As shown here at element 463, a smart contract executes and validates the transaction for the blockchain. Subsequently, a validated transaction 464 is then added to or transacted onto the blockchain 499.

Figure 5:
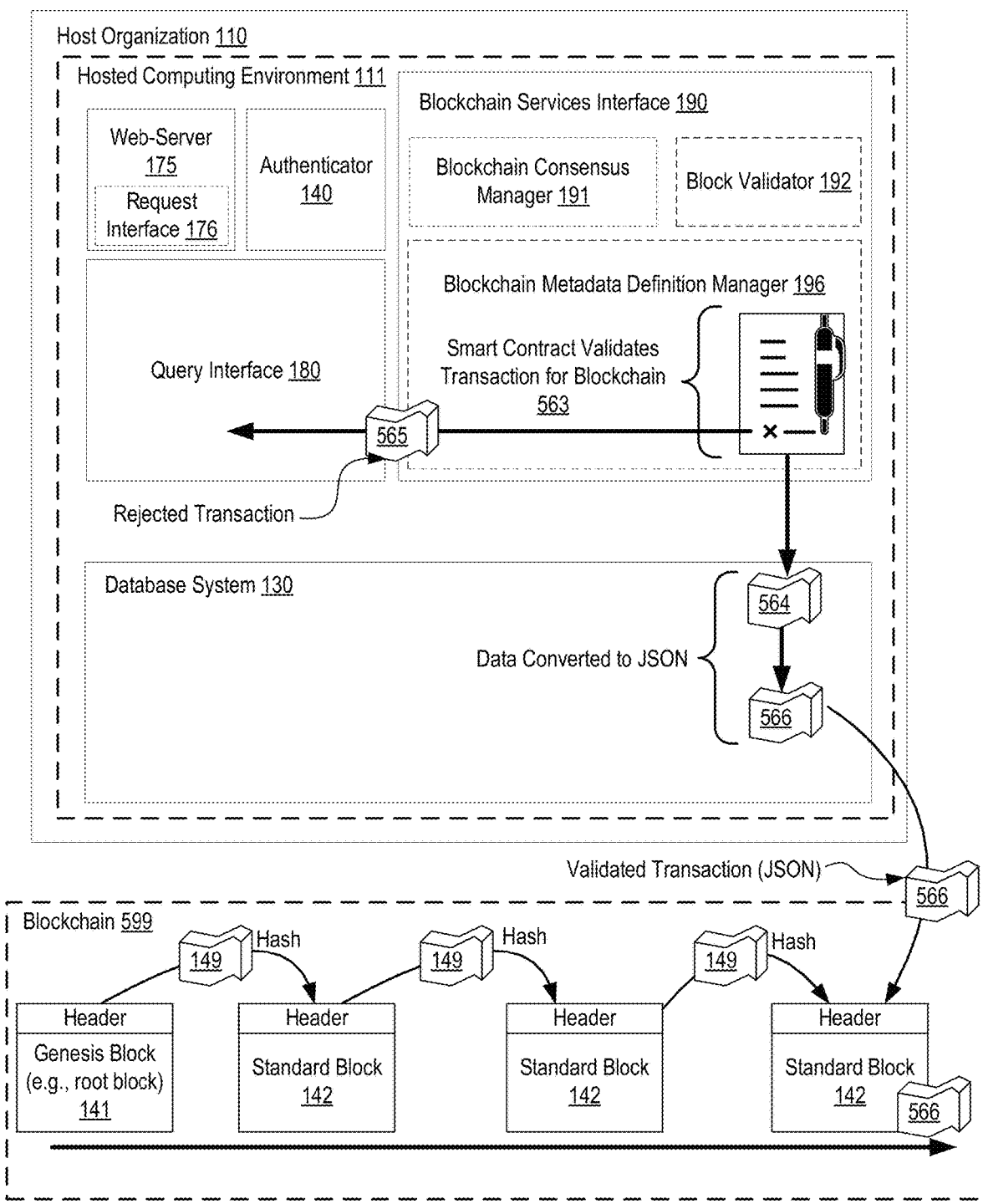
FIG. 5 depicts another exemplary architecture in accordance with described embodiments.

FIG. 5 depicts another exemplary architecture 501 in accordance with described embodiments.

Conventional solutions permit the storage of free-form text within an asset transacted onto the blockchain, for instance, storing such data within a payload portion of the asset, however, because such data is not validated, there is a risk that corrupted or incorrect data is written to the blockchain and later retrieved on the assumption that such data is valid.

By executing a smart contract to perform transaction validation of the entity or asset being transacted onto the blockchain, it is therefore possible to enforce various masks, data structures, data types, data format, or other requirements prior to such data being written to the blockchain 599.

According to such embodiments, the blockchain metadata definition manager 196 executes smart contract validation 563, and if the data to be written to the blockchain is not compliant with the requirements set forth by the executed smart contract, then the transaction is rejected 565, for instance, sending the transaction back to a query interface to inform the originator of the transaction. Otherwise, assuming the transaction is compliant pursuant to smart contract execution, then the transaction is validated 564 and written to the blockchain.

According to one embodiment, the smart contract applies a data mask to validate compliance of the data or metadata to be written to the blockchain. In other embodiments, the smart contract enforces rules which are applied to the data as part of the validation procedure.

According to one embodiment, the smart contract executes as part of a pre-defined smart contract system which executes with any blockchain which permits the use of smart contracts, and the smart contract performs the necessary data validation.

According to one embodiment, the data or metadata to be written to the blockchain 599 is converted to a JSON format to improve storage efficiency. JavaScript Object Notation (JSON) provides an open-standard file format that uses human-readable text to transmit data objects consisting of attribute-value pairs and array data types or any other serializable value. It is a very common data format used for asynchronous browser-server communication, including as a replacement for XML, in some AJAX-style systems. Additionally, because JSON is a language-independent data format, it may be validated by the smart contract on a variety of different smart contract execution platforms and blockchain platforms, regardless of the underlying programming language utilized for such platforms.

Thus, as depicted here, data or metadata to be written to the blockchain may be converted into a JSON format 566 (e.g., within database system 130 of the host organization 110) and the validated and converted JSON data is then transacted onto the blockchain.

Figure 6:
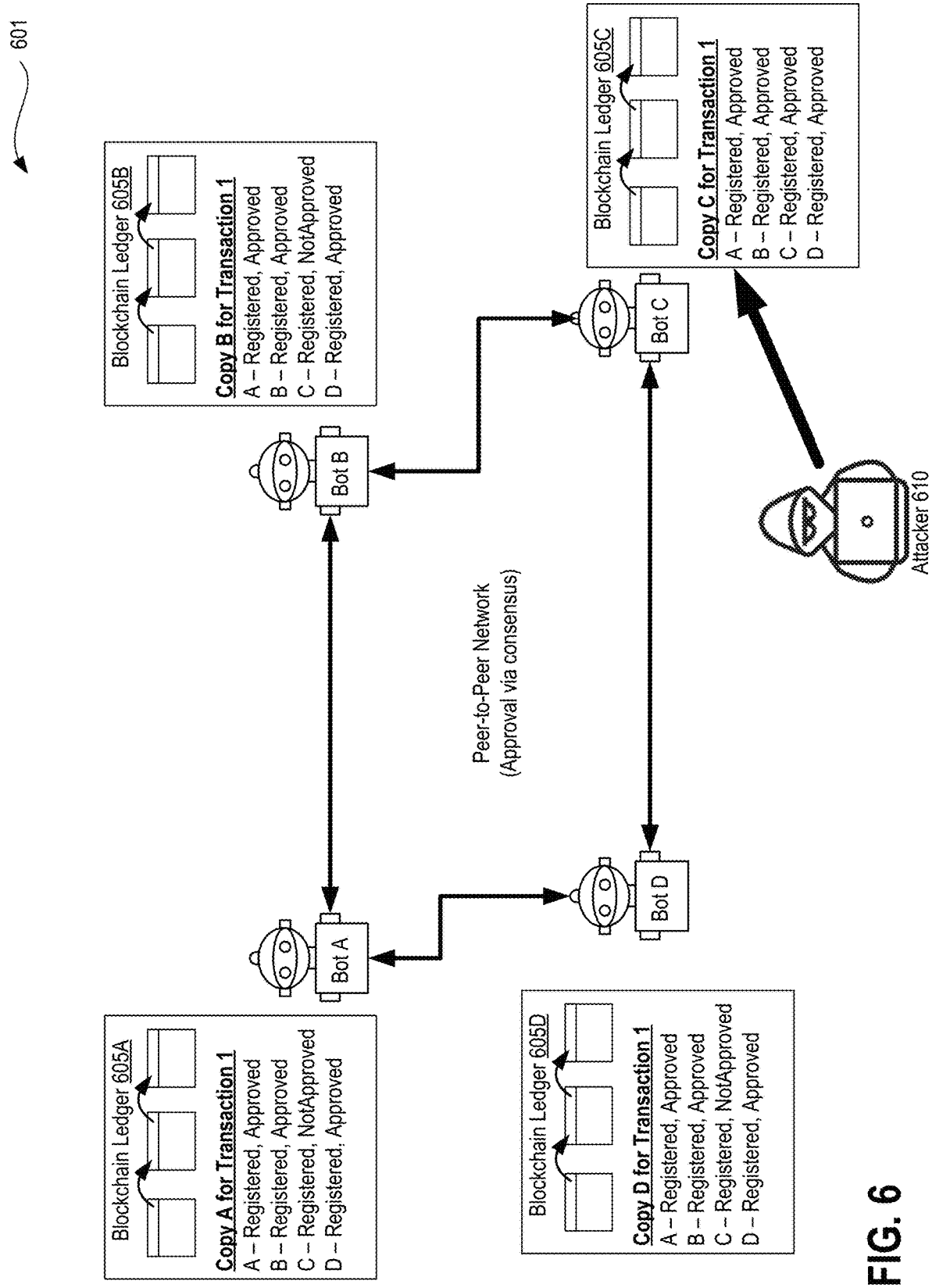
FIG. 6 depicts an exemplary peer-to-peer network architecture in accordance with described embodiments.

FIG. 6 depicts an exemplary peer-to-peer network architecture 601 in accordance with described embodiments.

As depicted here, there are multiple bots, bot A, bot B, bot C, and bot D, each communicating with one another via a peer-to-peer network by writing messages to the blockchain, so as to ensure that any message is subjected to the consensus mechanism of the blockchain.

In particular, there are multiple copies of the blockchain's ledger 605A, 605B, 605C, and 605D, each of which should be identical to one another. However, an attacker 610 has compromised blockchain ledger 605C and over-written the proper state with falsified information to show that a rejected transaction was actually approved. In particular, as may be seen here, blockchain ledger 605C shows that copy C for transaction 1 lists each of the bots (A, B, C, and D) all being registered and having approved transaction. However, when compared with the three other bots on the blockchain's peer-to-peer network formed by the four depicted bots, it is readily apparent from comparing the matching blockchain ledgers 605A, 605B, and 605D that the blockchain ledger 605C has been compromised by attacker 610.

Notwithstanding protections on the peer-to-peer network, it is still a possibility that the network is subjected to attack. However, because of the redundancy provided by the distributed network and the fact that multiple copies of the blockchain ledger result through the use of blockchain for storing the written transactions, an additional layer of protection is provided as the attacker 610 cannot realistically compromise all nodes (e.g., each of blockchain ledgers 610A-D) simultaneously as doing so would require an infeasible amount of computational resources.

Therefore, the other bots (e.g., bots A, B, and D) will recognize that bot C is an outlier with a compromised state and can therefore undertake actions to isolate, quarantine, silo, kill, eject, or otherwise negate any actions taken by the compromised bot C.

The host organization has applications that run on complex distributed systems which, unlike customer applications, are utilized by the host organization to manage the overall cloud computing architecture and to proactively monitor for potential problems before they become critical.

Building and operating such highly scalable systems requires automated solutions. As described herein, bots (e.g., ChatBots, VoiceBots), smart assistants, etc., may be utilized to manage the compute architecture. Proposed solutions may further leverage machine learning (ML) and artificial intelligence (AI) concepts to make intelligent decisions. Use of AI models when appropriately trained helps to ensure that the production environment within which customer orgs are processing business critical tasks, applications, and services, operates is in a "Self-Driving" mode where there is little intervention required from humans administrators to maintain the desired status within the cloud computing architecture.

In accordance with the described embodiment, such a "Self-Driving" system consists of multiple bots that cooperatively work in tandem to make intelligent decisions and to ensure the desired state of the cloud computing architecture is maintained at all times.

Such automation is, however, not without risk. Safeguards are therefore undertaken to product against bots going rogue, to protect against the chat log within which bots communicate being compromised by an attacker, and how to ensure that operational commands affecting the cloud computing architecture may be trusted when issued by the bots.

For example, as described herein, blockchain is utilized to ensure a trust factor exists amongst the bots in the network. Using Distributed Ledger Technology (DLT), a blockchain network is formed by the bots, each of which operate as a participating node on the newly formed blockchain network.

The blockchain network ensures that the information that is shared amongst the bots is persistently and immutably (e.g., unchangeably or permanently) stored in a database architecture called the ledger or blockchain ledger which is distributed across multiple hosts, as is depicted by the architecture 601 in which there are multiple blockchain ledgers 605A, 605B, 605C, and 605D.

Through the utilization of the blockchain network, every transaction is transparent to the blockchain network and transparent to all the bots on the blockchain network, as each bot (e.g., participating node on the blockchain network) will receive a copy of every transaction and its associated transaction information that occurs between the bots. For example, if a command is initiated, such as [scale-down] CPU usage in a cluster, the transaction will be issued to the blockchain and if accepted, made visible to all nodes/bots on the network as it will be appended to the blockchain ledger 605.

Before a blockchain transaction is added to the blockchain ledger, the transaction is first subjected to verification and consensus by the participating nodes on the blockchain. Validation may occur via a triggered smart contract which performs a validation scheme and enforces any applicable business rules or other control logic, or validation may occur by the participating nodes observing the transaction arriving at the blockchain and then applying validation and business rules and logic as a part of their consensus decision.

Once the participating nodes on the blockchain network vote for or against consensus and consensus is either attained or rejected, then the requested command embedded in the blockchain transaction will be carried out by either the deployment bot or by a smart contract with authority to execute the command to modify the cluster, VM, computing pod, or some other compute architecture being monitored by the bots on the blockchain network.

Because every transaction is verified appended to the blockchain ledger pursuant to successfully attaining consensus, the blockchain network formed by the bots is fully secured and protected by the bots in the blockchain network, which collectively agree on the appropriateness of any requested action before actually executing the action. Stated differently, each transaction by a bot in the network will have witnesses (e.g., the other participating nodes/bots on the network), who either approve or dismiss a requested action and thus build a sense of trust amongst the bots on the network.

Therefore, in the event that a bot, or even multiple bots, ultimately go rogue or otherwise misbehave, then any actions triggered by the rogue bot(s) will be logged in the distributed ledger and every other bot on the blockchain will be notified of this change as well as which bots initiated the inappropriate action requests.

Similarly, in the unlikely event that an attacker actually gains access to the chat log instance utilized by the bots and is thus able to write messages to the chat log and communicate with the bots via the chat log (e.g., if an attacker learns where the blockchain network is and successfully joins as a participating node or takes control of an already participating node), then even still, whatever action requests or commands are issued to the chat log by the malicious attacker would again be subjected to validation and consensus by the participating nodes on the network, which would reject requested actions by a malicious actor as such requested actions would be inconsistent with the trained AI model and inconsistent with expected actions to be taken for the operational environment.

For example, if a malicious actor issues an action request to scale down a compute cluster with moderate CPU utilization, then the question would be "why?" Why would a bot request a reduction of CPU capacity for a compute cluster that is appropriately utilized? Validation by the other nodes would look to verify that the compute cluster is under-utilized before scaling down. Similarly, if a bad actor or attacker issues commands to shut down a machine or to massively scale-up CPU instances for a compute cluster, then again, the other bots will perform validation and the question of "why" will have an illogical result, and thus, they will refuse to grant consensus.

In such a way, it is easy to detect the rogue bot(s) and then to take action to dismiss the harmful effects from a bad actor bot or a bot compromised by an attacker by isolating that bot on the blockchain network. This may be done by siloing the bot, terminating the bot, ejecting the bot from the distributed blockchain network, reducing the voting weight toward consensus of that bot, stripping authority from that bot to issue action request, etc.

Most often, a bad actor will likely be due to a node having hardware issues or being computationally overwhelmed or due to latency issues on an overburdened network, and thus, simply replacing that node instance will resolve the issue. However, in the event an attacker does secure access to the blockchain network, all actions will be futile as the redundancy built into the blockchain network will result in effectively no action being taken for any malicious action requests submitted by the attacker.

Consider yet another example, where there are six bots in the blockchain network which are responsible for provisioning and monitoring servers in the datacenter. Consider that one of the monitoring bots has turned rogue due to a hack by a malicious actor. The rogue bot (e.g., the compromised bot) then sends a message via a JSON payload to the provisioning bot or deployment bot asking the deployment bot to shut down a critical service, which would thus lead to a downtime/outage within the cloud computing architecture. In the case of a blockchain-based distributed network, both monitoring and deployment (or provisioning) bots must come to a consensus and decide via consensus voting whether the critical service needs to be shut down or not. Since the other monitoring bots in the network are not affected by the hack, they simply will not agree with the malicious request sent by the compromised bot, thus resulting in the consensus test failing and ultimately the service will not be shut down. In actuality, the transaction with the action request to shutdown the critical service will never actually be accepted to the primary or consensus chain of the blockchain ledger, and because this is a pre-requirement to acting on such an action request, the result of the malicious request is entirely negated and the improper shutdown avoided without any risk to the network.

The JSON payload will specify the instance type of a machine or cluster, the IP address, the command action requested, the criticality of the action requested, the requestor submitting the action request, etc. This information is written to the blockchain, subject to consensus, and thus, creates a rich log by which to review actions at a later time and by which a deployment bot will have sufficient information from the JSON payload to trigger the appropriate command action (e.g., to increase CPU instances, etc.).

Further still, because the blockchain ledger is immutable and transparent to all nodes on the blockchain network, information about the affected bot (including the request initiator) can easily be investigated and the compromised bot or the poorly operating bot may thus be isolated from the network.

Such isolation may occur through the actions of a human administrator or may be the result of other nodes on the blockchain taking action to eject, terminate, isolate, or quarantine a misbehaving node on the blockchain network. For example, if a node repeatedly sends action requests that are rejected or fail to attain consensus, then after a threshold number of bad attempts, the other nodes in the network may initiate an action to isolate that bad actor or compromised node, with the requested action to eject that node being subjected to consensus and validation just as occurs with other requested actions.

According to certain embodiments, the consensus requirements applied to any given transaction is based on the criticality of the requested action or the criticality of the affected service. For example, consensus required to up-scale the number of CPU instances in a cluster may require only a simple majority as such an action would be considered a low criticality whereas the request to entirely shut down a cluster or shut down a running service would be a high criticality task and thus, such a high criticality task may require unanimous consent before any action may be taken.

The criticality may be tied to a transaction "type" with each transaction type being associated with different smart contracts or in which different transaction types corresponding to the varying criticality of the action request will require different consensus protocols as pre-configured by a blockchain administrator.

Figure 7A:
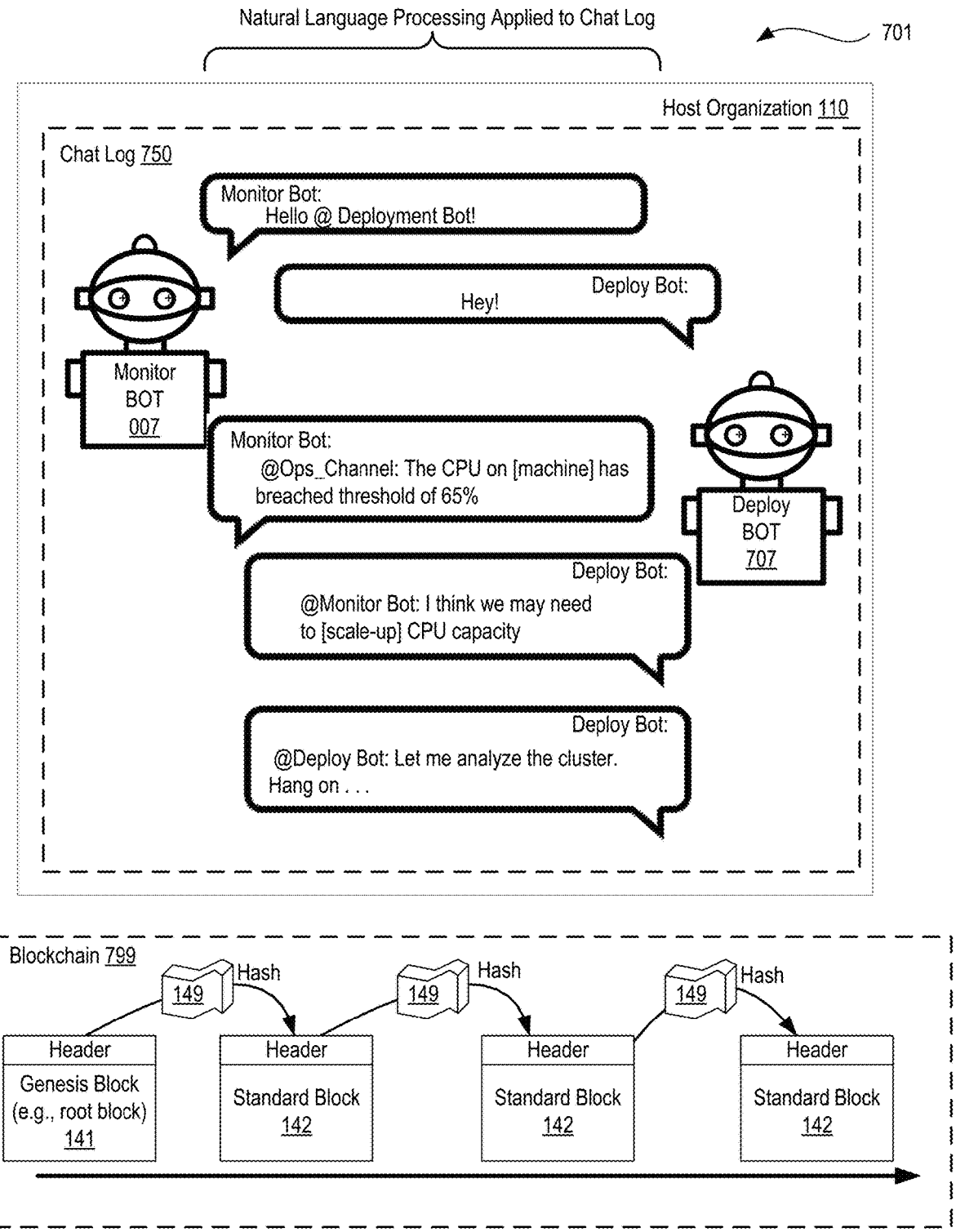
FIG. 7A depicts an exemplary natural language chat log conversation between bots, in accordance with described embodiments.

FIG. 7A depicts an exemplary natural language chat log conversation 701 between bots, in accordance with described embodiments.

As shown here, there are two bots presently participating in a natural language styled conversation, specifically, monitor bot 007 and deploy bot 707. Within the chat log 750, the monitor bot flags the deployment bot, saying "Hello @Deployment Bot!" The Deployment bot then responds "Hey!" After the conversation has been initiated, the monitor bot broadcasts a message to the @Ops_Channel, stating "The CPU on [machine] has breached threshold of 65%," to which the deploy bot (who is a member of the Ops_Channel) responds "I think we may need to [scale-up] CPU capacity." Here, the term [scale-up] is a command request to trigger an increase in CPU capacity (or some other compute capacity mentioned) for a particular system, cluster, pod, compute cloud, etc.

Lastly, the deploy bot further responds stating, "Let me analyze the cluster. Hang on . . . ." While the conversation is between two bots, there may be human participants also on the @Ops_Channel, such as a system administrator or other admin responsible for the systems. If the admin is a member of the @Ops_Channel, then he will be notified of the message and may thus observe the discussion between the bots within the chat log 750. The bots are able to interpret the messages and respond by applying natural language processing 765 to the chat log 750 so as to interpret the various commands, requests, status, and so forth.

Natural language processing (NLP) is a subfield of linguistics, computer science, information engineering, and artificial intelligence which specifically deals with the interactions between computers and human (natural) languages. Notably, NLP addresses the manner in which program computers process and analyze large amounts of natural language data, such as the natural language conversation being broadcast onto the chat lot 750.

Challenges in natural language processing frequently involve speech recognition, natural language understanding, and natural language generation. For example, the bots need to interpret that the [scale-up] command is contextually related to the CPU capacity and CPU exceeding the threshold.

The blockchain 799 is further depicted, however, the bots at this point have not affirmatively taken any specific action to change or alter the production environment they are monitoring, and so they have not yet initiated any transaction with the blockchain 799.

Figure 7B:
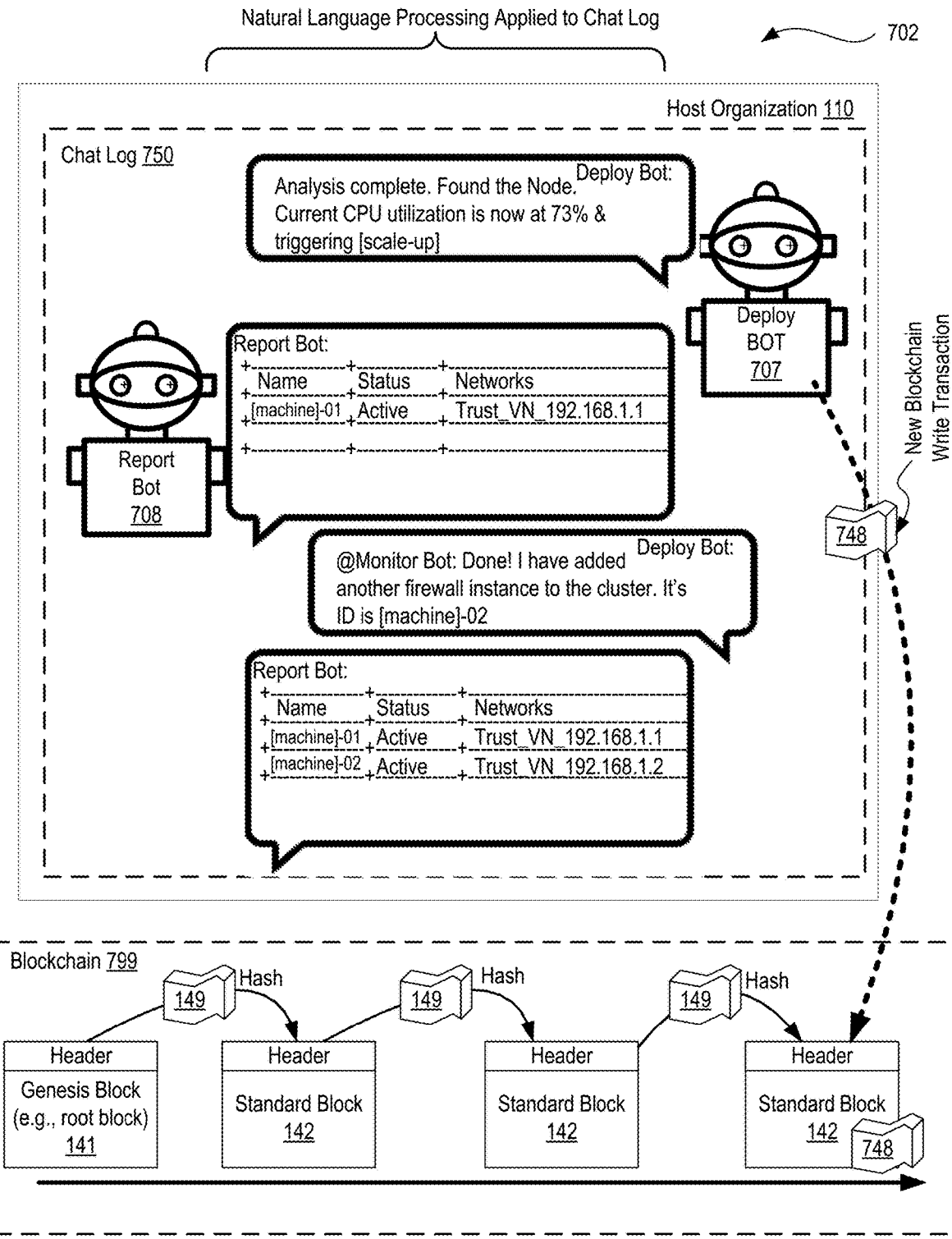
FIG. 7B depicts further details relating to the exemplary natural language chat log conversation 701 between bots, in accordance with described embodiments.

FIG. 7B depicts further details relating to the exemplary natural language chat log conversation 701 between bots, in accordance with described embodiments.

As can be seen here, the deploy bot has finished its analysis, and states "Found the node. Current CPU utilization is now at 73% & triggering [scale-up]."

Additionally shown is that the report bot 708 enters the conversation and provides some information about the cluster, showing that the current cluster has one active machine-01 active on the cluster at the specified name and IP address.

At this point, the Deploy bot 707 takes an affirmative action to modify the systems operating in the production environment by attempting to add another machine to the overburdened cluster. In support of this, the deploy bot 707 issues a new blockchain write transaction 748 onto the blockchain 799 which is then subjected to the consensus mechanism of the blockchain 799 before that write transaction 748 will be added to the blockchain.

Upon consensus being attained for the new write transaction 748, the [scale-up] command will be executed to add a new machine to the cluster. For instance, upon consensus being attained for the new write transaction 748, the [scale-up] command may be executed by a smart contract on the blockchain with the authority to receive and execute administrative level commands pursuant to consensus being reached for such commands. In other embodiments, the deploy bot 707 has the authority to execute administrative level commands pursuant to consensus being reached, but must wait until the new write transaction is actually appended to the blockchain 799 pursuant to successful validation and consensus on the blockchain from the participating nodes operating on the blockchain network.

After the deploy bot 707 states "Done! I have added another firewall instance to the cluster. Its ID is [machine]-02," the report bot then again enters the conversation with an updated report, now showing both machine-01 and machine-02 active on the cluster.

Thus, notwithstanding natural language processing being utilized to interpret the commands from the conversation, the bots are able to successfully navigate a monitored event (high CPU utilization) and perform analysis and take action, all of which is then protected due to the actual command to modify the cluster being subjected to consensus by the participating nodes on the blockchain.

FIG. 7C depicts further details relating to the exemplary natural language chat log conversation 701 between bots, in accordance with described embodiments.

Shown here, the bots finish their current conversation, with the monitoring bot stating "Thanks @Report Bot" and "@Deploy Bot: Cool! I can now see two machine instances," corresponding to the two machines in the updated report published by the report bot. Lastly, the deploy bot states "Excellent!"

Even though this example occurred entirely between bots, it is possible for an administrator to monitor the chat log in real time as the bots converse. It is further possible for an administrator to type into a chat log instance 750 at an administrators computing device and interact directly with the bots, for example, asking for status, issuing a command, such as [scale-up] CPU capacity or [shutdown] a machine name or [reboot] a machine name or [scale-down] a computing resource such as CPU or Memory or Network allocation, etc.

Moreover, an administrator monitoring the chat log may interact with the bots to reject a requested command, or to kill, isolate, terminate, eject, or kill a bot believed by the administrator to be a problem due to either malicious activity or more likely due to a misconfiguration or network latency issues or a poorly performing instance upon which one of the bots are running.

Figure 8:
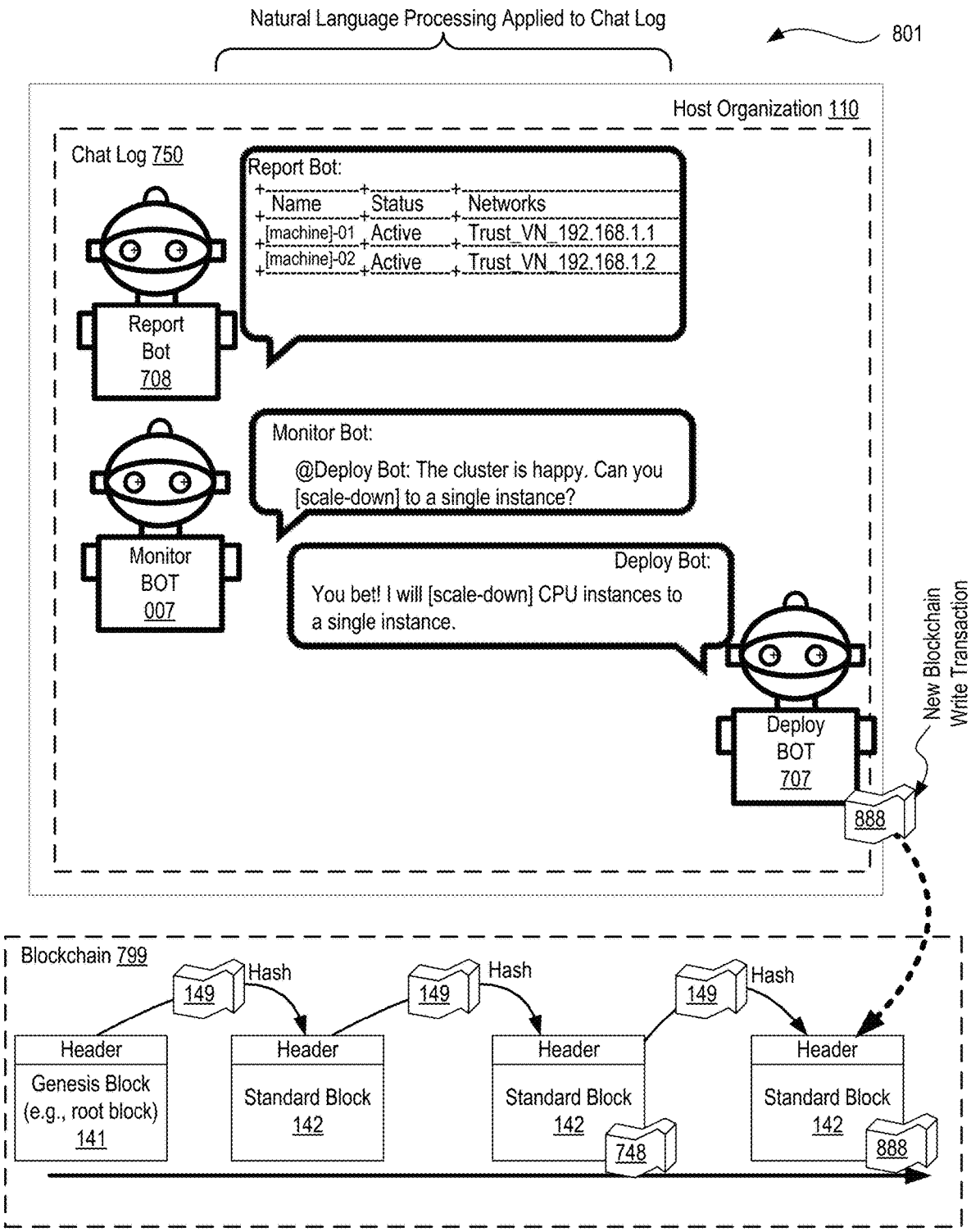
FIG. 8 depicts further details relating to the exemplary natural language chat log conversation between bots, in accordance with described embodiments.

FIG. 8 depicts further details relating to the exemplary natural language chat log conversation 801 between bots, in accordance with described embodiments.

Here the report bot 708 issues another updated report, still showing two active machines for the cluster. The monitor bot @ mentions the deploy bot, stating: "The cluster is happy. Can you [scale-down] to a single CPU instance." The Deploy bot then responds, "You bet! I will [scale-down] CPU instances to a single instance." Again, because the deploy bot now is taking an affirmative action to change the machines operating within the production environment, a new blockchain write transaction 888 is again issued, this type requesting to scale down CPU instances, and this new blockchain write transaction 888 is again subjected to consensus on the blockchain before the requested scale-down command will be acted upon by a smart contract executing on the blockchain or by the deploy bot which must await confirmation of consensus before taking action.

According to certain embodiments, the monitoring bot periodically checks the status of machines, VMs, clusters, compute pods, applications, etc., which are executing within the host organization's cloud computing infrastructure and writes a status to the blockchain indicating the heath of the monitored computing infrastructure. In other embodiments, the monitoring bot computes a hash of the current state being monitored and writes the hash onto the blockchain.

In certain embodiments, multiple redundant monitoring bots each monitor the same compute infrastructure and each writes a status representation or a hash onto the blockchain. In such an embodiment, the consensus and validation mechanism applied for the appropriate criticality of the requested action may require multiple status reports or multiple hashes to match before consensus can be attained. In such a way, even if a monitoring bot goes rogue or misbehaves, it still will have no detrimental effect on the production environment as other monitoring bots will disagree with the reports, status, or hashes provided by the rouge monitoring bot.

Figure 9:
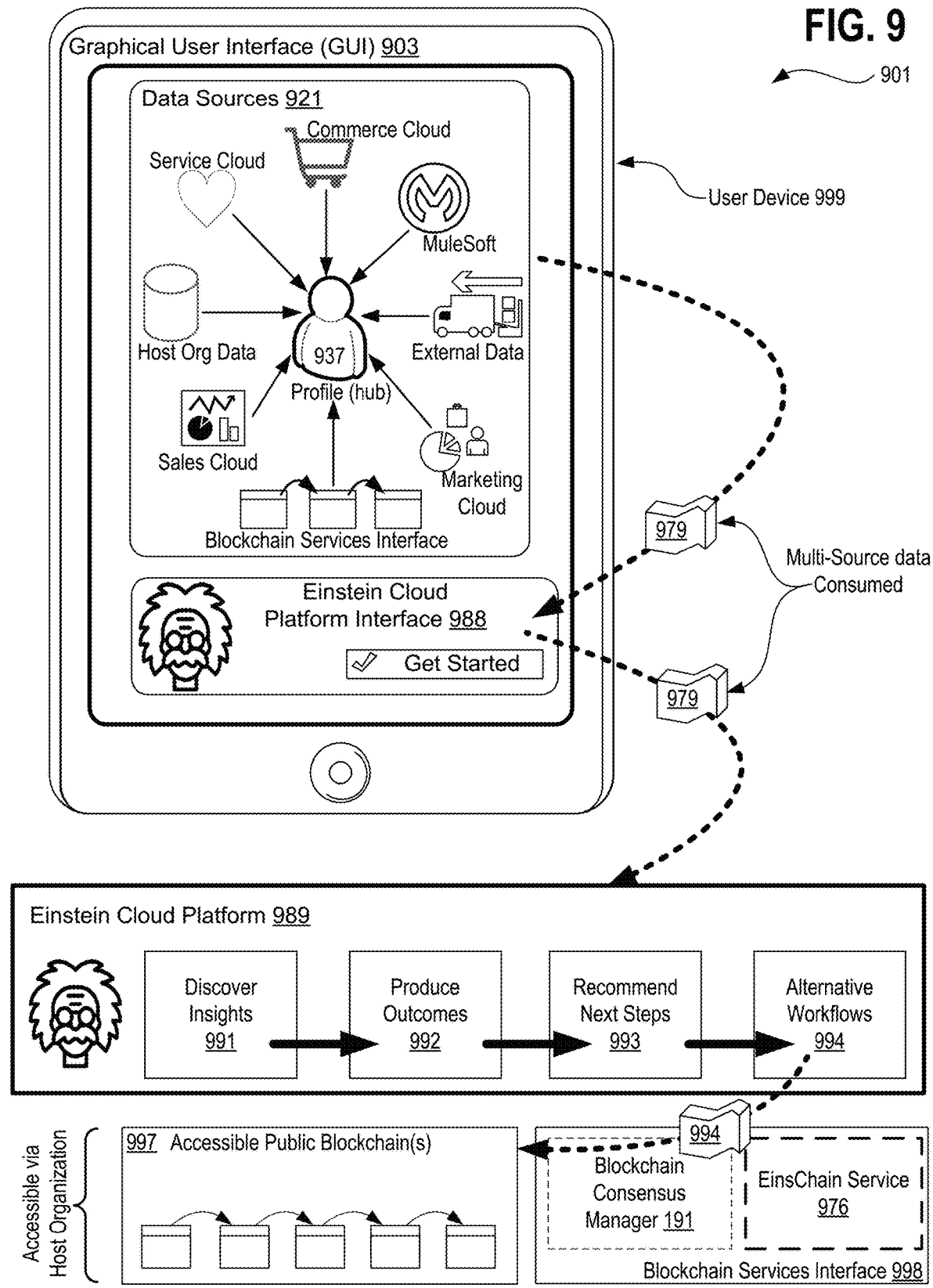
FIG. 9 depicts another exemplary architecture in accordance with described embodiments.

FIG. 9 depicts another exemplary architecture 901 in accordance with described embodiments.

As shown here, the host organization's applications responsible for managing the cloud computing architecture may communicate with the Einstein cloud platform 989 via the Einstein cloud platform interface 988 which is exposed to customers but also accessible to the host organization's own applications and processes.

The host organization may direct the Einstein cloud platform 989 to consume multi-source data 979 available from the Customer 360 platform, assuming such data sources 921 are linked via the customer's profile 937 operating as a centralized hub for such data. The host organization may maintain a bot network profile with linked information from, for example, the blockchain services interface or an analytics cloud.

The Einstein cloud platform 989 provides various services, such as the discovery of insights 991, the ability to produce outcomes 992, recommended next steps 993 for that customer, and ultimately may produce and output alternative workflows 994. Further still, output from the Einstein cloud platform 989 may be transacted onto accessible public blockchains 997 via the blockchain services interface 998 described above (e.g., including use of the blockchain consensus manager 191 and the host organization's EinsChain service 976 implemented via the blockchain services interface 998). Such blockchains are made accessible to customer and the host organization via the blockchain services interface 998. Alternatively, alterative workflows 994 and other recommended next steps, predictions, and other output may be written to any internally hosted blockchain of the host organization or may be written to both internal and externally hosted blockchains or selectively written to one or the other based on defined criteria.

The salesforce.com Einstein cloud platform 989 provides capabilities to the customer organizations and to the host organization via the Einstein cloud platform interface 988 which consumes multi-source data 979 from the various data sources 921 (e.g., the service cloud, commerce cloud, sales cloud, marketing cloud, from internally stored host organization data, from externally stored data, from data stored on blockchains accessible from the blockchain services interface, from MuleSoft data, etc.

Via the Einstein cloud platform 989, discover insights 991 capabilities help to identify significant patterns in data that may be affirmatively acted upon, such as information provided by the monitoring and reporting bots. The discover insights 991 capabilities enable discovery of the cause of patterns and causal events, often unknown to administrators.

Via the Einstein cloud platform 989, produce outcomes 992 capabilities, it is possible for the host organization to leverage powerful AI capabilities which are exposed via the Einstein cloud platform interface 988. Such capabilities enable administrators to know what to do next. Through the Einstein cloud platform 989, the bot network and the administrators will realize increased efficiency with AI-powered advice and produced outcomes, displayed directly to the administrator's user devices 999.

The Einstein cloud platform 989 brings artificial intelligence and machine learning to administrators who utilize the platform in the same manner as customers of the host organization's on-demand cloud based service.

AI is only as powerful as the data which powers it, but the Einstein cloud platform 989 has plenty of data, training Einstein predictive models on a range of data collected by Salesforce products including internally utilized analysis applications accessible to the bots on the blockchain network.

The Einstein cloud platform 989 provides additional capabilities for App Cloud users and developers to bring AI features, such as predictive or suggested actions, into new or existing apps, based on the consumption of the multi-source data 979.

The Einstein cloud platform 989 provides Einstein Bots, where customers can create chatbots powered by historical performance and computing architecture data to respond to common events, such as a cluster over utilized or a cluster underutilized.

The Einstein cloud platform 989 further enables Predictive Sort, which uses machine learning to personalize the order in which products appear in search and category pages to administrators.

The Einstein cloud platform 989 and Analytics Cloud Einstein users may utilize predictive wave apps to uncover future patterns for any aspect of the production computing environment, smart data discovery which will help administrators find and explain insights from their data, and automated analytics to prioritize insights.

IoT Cloud Einstein include predictive device scoring, recommend best next actions for service processes and marketing journeys, and automated IoT rules optimization.

The Einstein cloud platform 989 further enables users to obtain insights for every role, function, and industry on a complete artificial intelligence platform.

The Einstein cloud platform 989 permits users to build custom predictions and recommendations with clicks, embed predictive insights into any record or in any app, operationalize AI by adding it to every workflow or business process and to apply machine learning natural language processing computer vision automatic speech recognition to existing data sets.

The Einstein cloud platform 989 provides machine learning which uses past data to predict what will happen in the future with minimal programming. The Einstein Discovery gives CSAT trends and insights alongside an Einstein Analytics dashboard while the Einstein Discovery engine boosts productivity and discover relevant patterns in all your data, whether it lives in Salesforce or outside enabling administrators to find simple AI insights and recommendations to systemic problems. Then, take action on those findings.

The Einstein cloud platform 989 and the Einstein Next Best Action function delivers proven recommendations to employees and customers, right in the apps where they work and permits users to define recommendations, create action strategies, integrate predictive models, display recommendations, and activate automation.

The Einstein cloud platform 989 utilizes natural language processing to extract meaning from every piece of text and utilizes natural language processing (NLP) to find linguistic patterns you can use to answer questions, respond to requests, and identify conversations amongst participating bots/nodes on the blockchain network.

The Einstein cloud platform 989 utilizes an Einstein Language which permits users to understand how customers feel, automatically route inquiries, and streamline your workflows. Build natural language processing into apps to classify the underlying intent and sentiment in a body of text. Functions implement Einstein scanning of content and to provide a synopsis for a Salesforce user to follow.

For example, with The Einstein cloud platform 989, entering text into a chatbot permits users to easily build, train, and deploy custom bots on digital channels that are connected to administrators' analytics data for the cloud compute infrastructure.

According to one embodiment, fully compliant audit records are stored in an immutable format, such that all transactions are permanently recorded along with consensus by participating nodes. Any change to a record is immutably stored, but never removes the prior transaction occurrence, once that transaction is accepted to the blockchain as a consensus approved transaction and thus embedded within an adopted and accepted block on the main chain of the blockchain.

According to another embodiment, multi-tenant support is provided by the immutable and audit compliant record keeping for such transactions. According to such an embodiment, the transactions include data which describes a collection of data descriptors from the following exemplary list: what decision was made by the AI trained model, what version of the AI model made the decision, what decision was made, what collection of training data was utilized to train the AI model, any confidence score or predictive score output by the AI model, what Einstein cloud platform features or GUIs were utilized, and AI intermediate node decision points triggered to lead to the output decision by the Einstein cloud platform.

With regard to Einstein cloud platform 989 Bots, agents, or vision, an API is provided by the Einstein cloud platform which permits the EinsChain service to record data output and decision considerations by the Einstein cloud platform, all of which is stored to the blockchain upon which the customer org is a participating node, thus storing all registered data requirements for any Einstein cloud platform features, decisions, and actions recommended by the Einstein cloud platform and adopted/accepted by the business.

While the EinsChain enables the immutable storage and management of Einstein Platform decisions onto the blockchain in a multi-tenant aware format, the EinsChain may be utilized for immutably storing other data streams to the blockchain, such as the host organization's IoT cloud platform and other cloud platforms (e.g., the commerce cloud platform, the customer success platform, etc.) as provided by the host organization.

Problematically, it is known that an AI or deep learning system trained on poor or inaccurate data could result in erroneous decisions and recommendations being output as well as the possibility that data upon which a decision is made (not the training data, but the input data to be evaluated based on a trained AI model) may also be inaccurate, resulting in a bad or incorrect decision, action, or recommendation.

It is in such situations where tracking and transparency are especially important. Historically, such data would not be available for review in the event of an audit or a customer requested review of a decision.

However, through the use of the EinsChain service, in the event that the AI system does recommend something inaccurate, then subsequently, the reasons for why the recommendation was made may be reviewed and understood, and the erroneous recommendation may thus be corrected. Similarly, if inaccurate data inputs were the cause of the erroneous recommendation, then again, the EinsChain will track and immutably record this information to the blockchain and that day may later be retrieved and reviewed by the people needing access to that data, be it an auditor, a regulator, a customer service agent, etc.

As noted above, such information may further be mandated pursuant to compliance requirements, statutory requirements, regulations, auditability requirements, etc.

According to one embodiment, every AI and deep learning cloud platform provided by the host organization permits the user of such services to configure the EinsChain to record the data stream and output of the AI and deep learning cloud platforms for the purposes of at least transparency and audit ability, in which the decisions, recommendations, actions, and factors considered by such AI and deep learning platforms is immutably written to a blockchain for later retrieval via an API or GUI exposed utilizing the EinsChain service.

Because the blockchain provides immutable storage, it is well suited to store such audit data as the records cannot later be changed or fraudulently manipulated. In an alternative embodiment where data is not shared amongst multiple tenants and therefore only utilized by a single tenant, there is no need to utilize blockchain, although the single tenant may elect to do so, or the EinsChain may be configured to do so, regardless of how many tenants' data is involved. Nevertheless, where a single tenant requires audit data to be stored, they may configure EinsChain to persist the data to an immutable database for persistent storage, without utilizing any blockchain or distributed ledger.

According to described embodiments, the Einstein cloud platform 988 incorporates artificial intelligence (AI) via the recommended next steps 993 which customers and businesses may then incorporate directly into their workflows, thus generating alternative workflows 994 produced, recommended, and output from the Einstein cloud platform 988.

Sometimes these alternative workflows 994 are produced and generated by the AI of the Einstein cloud platform 988 for customer review and acceptance, in which an affirmative action to accept or reject the recommended alternative workflow 994 is required before the alternative workflow 994 is transacted onto the blockchain.

However, in other embodiments, the Einstein cloud platform 988 generates an alternative workflow 994 which is generated and output and then transacted onto the blockchain automatically without human intervention pursuant to a customer organization's configuration parameters.

In such an event, it is quite possible that the Einstein cloud platform 988 generates an AI model which is transacted onto the blockchain and implemented via a smart contract which executes on the blockchain to enforce business rules or other criteria and decision output from the AI model. For example, the AI model may be trained based on partner data and data of the customer organization and then determine to reject credit applications on the basis of data correlations derived from a training dataset by the AI model without human intervention. Stated differently, the AI model trained on such data may establish its own rules and decision making criteria. If this AI model is then output as an alternative workflow 994 from the Einstein cloud platform 988 and then transacted onto the blockchain and enforced via smart contracts executing on the blockchain, then it is very possible that the results of the Einstein cloud platform's 988 trained AI model may affect both the business and the business's customers in a real-world manner, by, for example, accepting or rejecting a request to alter a critical service.

It is therefore important that the precise details of that AI model be recorded and tracked for the purposes of having an audit trail, in the event that a customer, the business, administrator, etc., seeks to understand what AI model was utilized to make a decision (e.g., such as a shutting down a compute cluster), as well as precisely what version of that AI model was utilized and further, what training dataset or what version and time-span of training data was utilized in training the AI model, which then led to a particular decision as enforced by the smart contract on the blockchain.

The AI model may therefore be registered with an audit keeping service which operates to track when alternative dataflows 994 are output by the Einstein cloud platform 988 and transacted onto the blockchain for use, as well as what version of the AI model, what training data set was utilized, etc.

In such a way, it then possible for customers, businesses, or administrators to subsequently review and investigate how a particular decision was made, even when that decision was made by an AI model automatically generated, output, and implemented by transacting the AI model onto the blockchain with business rules and criteria enforced by smart contracts executing on the blockchain.

According to certain embodiments, the Einstein cloud platform 988 trains a new AI model, registers the version information for the AI model and the training data set with an audit record keeping service pursuant to a request (e.g., regardless of whether the request is an automatic request from a controlling application or a request from an administrator, etc), and then deploys the AI model by transacting a smart contract to execute at the blockchain and enforce decisions and recommendations made by the AI model.

According to another embodiment, reinforcement learning is further utilized to the trained AI model via a feedback loop which adds decisions to accept or reject transactions to a new reinforcement training data set. For example, the new reinforcement training data may be continuously streamed to the AI model which updates on an ongoing basis or the new reinforcement training may be utilized to re-train the AI model on an as-needed basis, or the new reinforcement training may be utilized to incrementally update the trained AI model based on the incremental new reinforcement training data as it becomes available in small batches.

Feedback loops ensure that the AI model's results do not stagnate. This also has a significant advantage in that this data used to train new versions of the model is of the same real-world distribution that the customer cares about predicting over. Without such feedback loops, the AI model will choose the path of least resistance, even when that path is wrong, causing its performance to deteriorate over time. By incorporating a feedback loop, the AI model's training is reinforced and will improve over time.

Importantly, not all transactions on the blockchain will attain consensus which is consistent with the AI model's recommendations and decisions to accept or reject transactions. These results are very helpful to the AI model's continued training. While most are likely to correspond to the AI model's recommendation, it is nevertheless possible that some transactions will be rejected (that is they will not attain consensus) despite the AI model recommending to accept them. In other circumstances, it is possible that the AI model issues a decision to reject a transaction which is nevertheless transacted onto the blockchain successfully after attaining consensus, notwithstanding the AI model's recommendation. According to one embodiment, the AI model operates as a participating node with consensus voting rights. In certain embodiments, the AI model has equal consensus voting weight to other participating nodes, whereas in other embodiments, the consensus voting may be biased in favor of the AI model or against the AI model by granting greater or lesser consensus voting weight to the AI model's participating node.

Many modern businesses operate on the basis of AI-driven workflows derived on the basis of data-driven criteria established by the AI model from, for example, a training data set. Such a training data set may be based on commercially available data, data produced and stored by a particular business, as taught herein, data which is shared amongst two or more business via the customer 360 platform and the Salesforce cloud computing platform (e.g., the AI model may be trained based on a training data set shared between two or more of tenants or customer organizations which subscribe to services of the host organization).

Data provides insights that enable better decisions and processing such data via the training of an AI model provides means by which to extract those insights and take actions.

Figure 10:
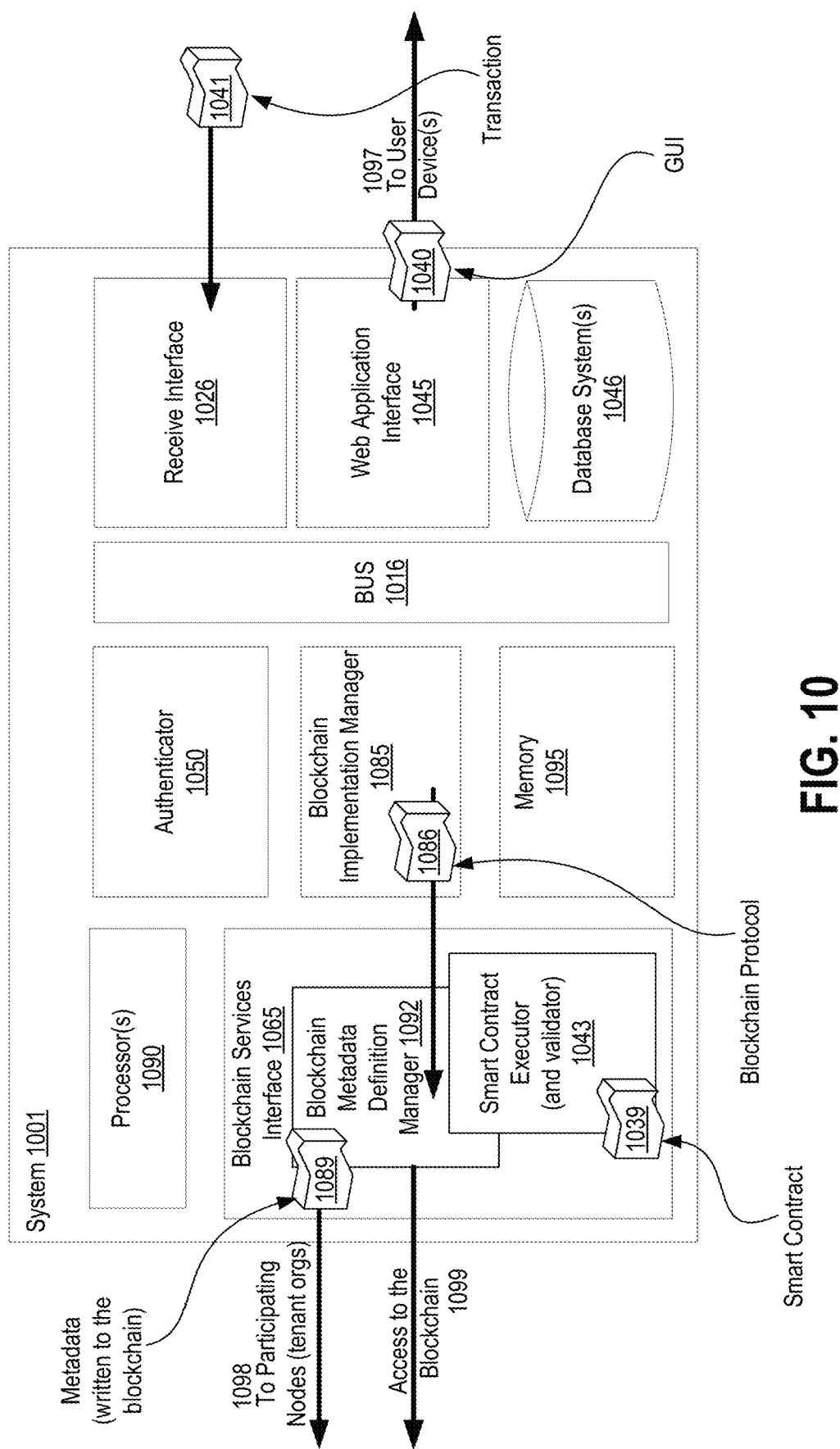
FIG. 10 shows a diagrammatic representation of a system within which embodiments may operate, be installed, integrated, or configured in accordance with described embodiments.

FIG. 10 shows a diagrammatic representation of a system 1001 within which embodiments may operate, be installed, integrated, or configured. In accordance with one embodiment, there is a system 1001 having at least a processor 1090 and a memory 1095 therein to execute implementing application code for the methodologies as described herein. Such a system 1001 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 1001, which may operate within a host organization, includes the processor 1090 and the memory 1095 to execute instructions at the system 1001. According to such an embodiment, the processor 1090 is to execute a blockchain services interface 1065 on behalf of a plurality of tenants 1098 of the host organization, in which each one of the plurality of tenants 1098 operate as a participating node with access to the blockchain 1099. Internal to the blockchain services interface 1065, there is depicted the blockchain metadata definition manager 1092, depicted here as writing metadata onto the blockchain via its access to the blockchain 1099 as provided by the blockchain services interface 1065.

A receive interface 1026 of the system 1001 is to receive a transaction 1041 for the blockchain requesting the host organization to update a data record persistently stored on the blockchain, in which the transaction specifies updated values for one or more of a plurality of data elements of the data record. Such a system further includes a smart contract 1039 executable via the processor 1090 and the smart contract executor and validator 1043 via which to validate the updated values specified by the transaction 1041 before permitting the transaction to be added to the blockchain to update the data record on the blockchain with the updated values. A blockchain services interface 1065 is further provided via which to the system 1001 is to write the updated values for the data record to the blockchain by adding the transaction 1041 to a new block on the blockchain pursuant to successful validation of the updated data values by the smart contract 1039.

A blockchain protocol 1086 for the blockchain defines a group of functions for the blockchain (e.g., as provided by the blockchain implementation manager 1085), in which the group of base functions are accessible to any participating node 1098 of the blockchain. The system 1001 may further persist metadata 1089 onto the blockchain; in which the receive interface 1026 is to further receive a transaction 1041 requesting such metadata 1089 to be stored to the blockchain, sometimes for use with validating updated values of a received transaction 1041. According to such a system 1001, the blockchain services interface 1065 is further to add the transaction 1041 to a new block on the blockchain pursuant to successful validation by the smart contract 1039.

According to such an embodiment of the system 1001, the receive interface 1026 may pass the transaction data contents of the transaction 1041 to be stored within in index persisted by the database system(s) 1046.

According to such an embodiment of the system 1001, a GUI 1040 may be pushed to the user devices 1097 via which the user devices or admin computing devices may interact with the blockchain metadata definition manager 1092.

According to another embodiment of the system 1001, the blockchain services interface 1065 is to interact with and provide access to the blockchain 1099.

According to another embodiment of the system 1001, the receive interface 1026 communicates with a user client device 1097 remote from the system and communicatively links the user device with the system via a public Internet. According to such an embodiment, the system operates at a host organization as a cloud based service provider to the user device 1099; in which the cloud based service provider hosts a receive interface 1026 exposed to the user client device via the public Internet, and further in which the receive interface (or web application interface 1045) receives inputs from the user device as a request for services from the cloud based service provider.

Bus 1016 interfaces the various components of the system 1001 amongst each other, with any other peripheral(s) of the system 1001, and with external components such as external network elements, other machines, client devices, cloud computing services, etc. Communications may further include communicating with external devices via a network interface over a LAN, WAN, or the public Internet while the authenticator 1050 authenticates user devices and users seeking to access data from the host organization exposed by the system 1301.

FIG. 11 depicts a flow diagram illustrating a method 1100 for conducting transactions between bots using Distributed Ledger Technology (DLT) in a cloud based computing environment such as a database system implementation supported by a processor and a memory to execute such functionality to provide cloud based on-demand functionality to users, customers, and subscribers.

Method 1100 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1150, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1100 depicted at FIG. 11, at block 1105, is a method for conducting transactions between a plurality of bots, by performing the following operations:

Processing logic at block 1110 operates, by a cloud service provider, an interface to a blockchain, wherein each bot is a node on the blockchain.

Processing logic at block 1115 posts a transaction request to a chat log by one of the plurality of bots or an administrator.

Processing logic at block 1125 writes the transaction request, and an identification of the one of the plurality of bots or the administrator requesting the transaction, to the blockchain.

Processing logic at block 1135 negotiates consensus among the plurality of bots as nodes on the blockchain to conduct the requested transaction.

Processing logic at block 1130 shows that upon consensus being reached, the following sub-operations occur: (i) Writing the transaction to the blockchain, (ii) Pulling the transaction request from the chat log by one of the plurality of bots, and (iii) Conducting the transaction by the one of the plurality of bots that pulled the transaction request from the chat log.

Processing logic at block 1135 posts completion of the transaction to the chat log by the one of the plurality of bots that conducted the transaction.

According to another embodiment of method 1100, posting the transaction request to the chat log by one of the plurality of bots includes a monitoring bot posting the transaction request to the chat log; and in which pulling the transaction request from the chat log by one of the plurality of bots, and conducting the transaction by the one of the plurality of bots that pulled the transaction request from the chat log, includes a deployment bot pulling the transaction request from the chat log, and conducting the transaction.

According to another embodiment of method 1100, negotiating consensus among the plurality of bots as nodes on the blockchain to conduct the requested transaction further includes negotiating consensus among the plurality of bots as nodes on the blockchain as to one of: the identity and authority of the one of the plurality of bots requesting the transaction; and the identity and authority of the one of the plurality of bots to write the transaction request to the blockchain.

According to another embodiment, method 1100 further includes the following sub-operations when consensus is not reached: dismissing the transaction request; and posting dismissal of the transaction request to the chat log by the one of the plurality of bots that pulled the transaction request from the chat log.

According to another embodiment, method 1100 further includes the following sub-operation when consensus is not reached: isolating or quarantining the one of the plurality of bots requesting the transaction.

According to another embodiment of method 1100, isolating the one of the plurality of bots requesting the transaction includes prohibiting the one of the plurality of bots requesting the transaction from one of: posting transaction requests to the chat log; writing transaction requests to the blockchain; pulling transaction requests from the chat log; and conducting transactions.

According to another embodiment, method 1100 further includes one or more of the following sub-operation when consensus is not reached: terminating the one of the plurality of bots requesting the transaction; prohibiting any bot among the plurality of bots that initiated or caused the one of the plurality of bots to request the transaction from initiating or causing any of the plurality of bots to request transactions; and prohibiting or terminating a computer program, or source thereof, or an attacker initiating, or causing, or otherwise taking control of, any of the plurality of bots to request transactions.

According to another embodiment of method 1100, each of the plurality of bots controls a respective one of: a plurality of computer system or virtual machine hardware or software parameters, states, resources, and instances; and in which conducting transactions between the plurality of bots includes conducting transactions between or involving the plurality of computer system or virtual machine hardware or software parameters, states, resources, and instances respectively controlled via the plurality of bots.

According to another embodiment of method 1100, at least two of the plurality of bots are functionally redundant and control a respective at least two of a plurality of computer system or virtual machine hardware or software parameters, states, resources, and instances that are functionally redundant.

According to another embodiment, method 1100 further includes: periodically writing to the blockchain a hash of a current state of the plurality of computer system or virtual machine hardware or software parameters, states, resources, and instances respectively controlled by the plurality of bots; and in which negotiating consensus among the plurality of bots to conduct the requested transaction includes denying approval or consensus among the plurality of bots to conduct the requested transaction when the one or more of the plurality of bots fails to approve the requested transaction based on a difference in the blockchain detected by at least one of the bots regarding the hash of at least one of the current state of the plurality of computer system or virtual machine hardware or software parameters, states, resources, and instances controlled by a respective one of the plurality of bots.

According to another embodiment of method 1100, negotiating consensus among the plurality of bots to conduct the requested transaction further includes achieving consensus among the plurality of bots to conduct the requested transaction when a threshold number of the plurality of bots approve the requested transaction based on a match in the blockchain detected among the bots regarding the hash of the current state of the plurality of computer system or virtual machine hardware or software parameters, states, resources, and instances respectively controlled by the plurality of bots.

According to another embodiment of method 1100, negotiating consensus among the plurality of bots to conduct the requested transaction further includes achieving consensus among the plurality of bots to conduct the requested transaction when a threshold number of the plurality of bots approve the requested transaction based on one of: a type, priority, or criticality of the request, the requested transaction, the corresponding computer system or virtual machine hardware or software parameters, states, resources, and instances, and a cloud service provider cloud computing production, development, or sandbox, environment.

According to a particular embodiment, there is a non-transitory computer readable storage media having instructions stored thereon that, when executed by a system of a host organization having at least a processor and a memory therein, the instructions cause the system to perform the following operations: operating, by a cloud service provider, an interface to a blockchain, in which each bot is a node on the blockchain; posting a transaction request to a chat log by one of the plurality of bots or an administrator; writing the transaction request, and an identification of the one of the plurality of bots or the administrator requesting the transaction, to the blockchain; negotiating consensus among the plurality of bots as nodes on the blockchain to conduct the requested transaction; and when consensus is reached: writing the transaction to the blockchain; pulling the transaction request from the chat log by one of the plurality of bots; and conducting the transaction by the one of the plurality of bots that pulled the transaction request from the chat log; and posting completion of the transaction to the chat log by the one of the plurality of bots that conducted the transaction.

According to yet another embodiment, there is a system to execute at a host organization, in which the system includes: a memory to store instructions; a processor to execute instructions; in which the system is configurable to execute the instructions via the processor to carry out operations including: operating, by a cloud service provider, an interface to a blockchain, in which each bot is a node on the blockchain; posting a transaction request to a chat log by one of the plurality of bots or an administrator; writing the transaction request, and an identification of the one of the plurality of bots or the administrator requesting the transaction, to the blockchain; negotiating consensus among the plurality of bots as nodes on the blockchain to conduct the requested transaction; and when consensus is reached: writing the transaction to the blockchain; pulling the transaction request from the chat log by one of the plurality of bots; and conducting the transaction by the one of the plurality of bots that pulled the transaction request from the chat log; and posting completion of the transaction to the chat log by the one of the plurality of bots that conducted the transaction.

Figure 12A:
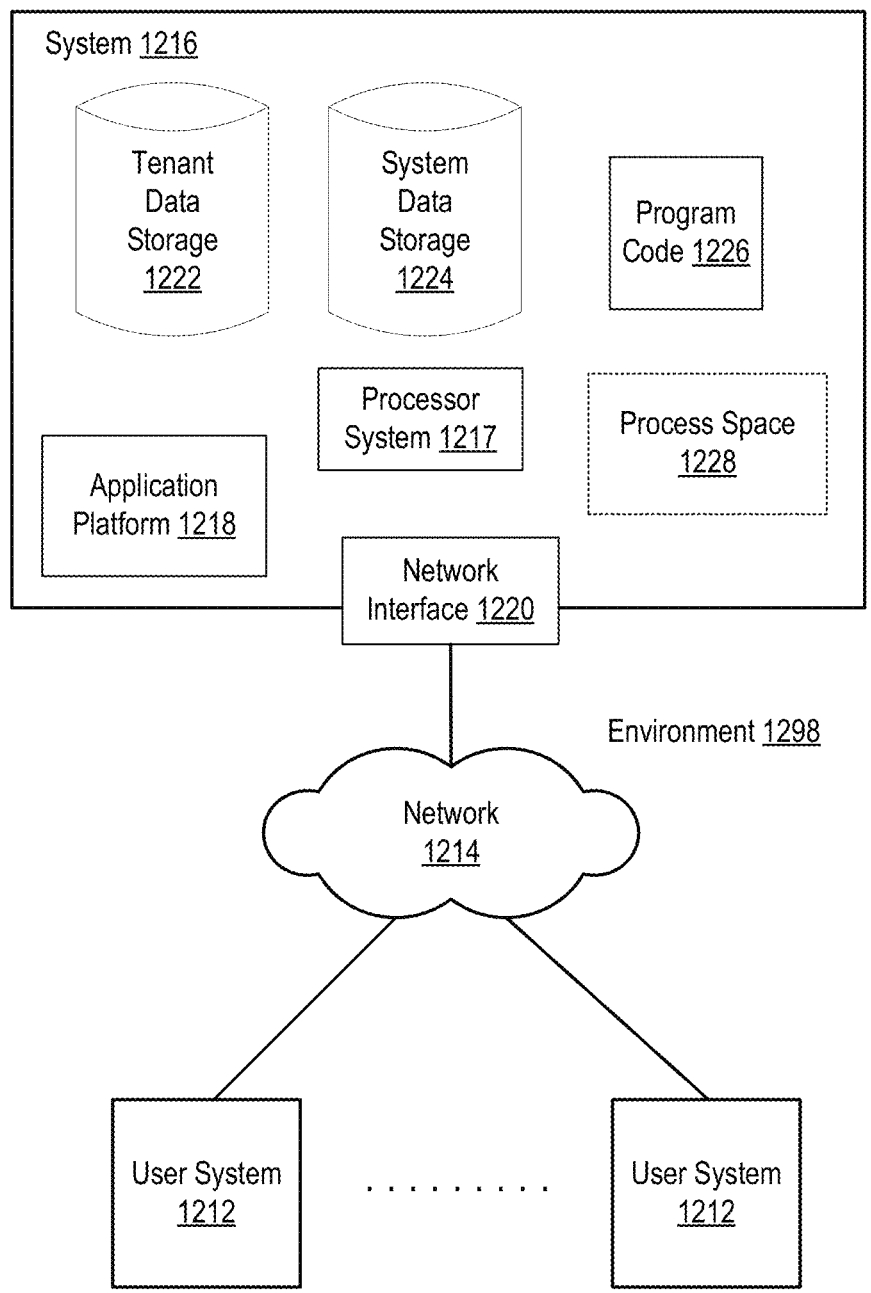
FIG. 12A illustrates a block diagram of an environment in which an on-demand database service may operate in accordance with described embodiments.

FIG. 12A illustrates a block diagram of an environment 1298 in which an on-demand database service may operate in accordance with the described embodiments. Environment 1298 may include user systems 1212, network 1214, system 1216, processor system 1217, application platform 1218, network interface 1220, tenant data storage 1222, system data storage 1224, program code 1226, and process space 1228. In other embodiments, environment 1298 may not have all of the components listed and/or may have other elements instead of, or in addition to, those listed above.

Environment 1298 is an environment in which an on-demand database service exists. User system 1212 may be any machine or system that is used by a user to access a database user system. For example, any of user systems 1212 may be a handheld computing device, a mobile phone, a laptop computer, a work station, and/or a network of computing devices. As illustrated in FIG. 12A (and in more detail in FIG. 12B) user systems 1212 might interact via a network 1214 with an on-demand database service, which is system 1216.

An on-demand database service, such as system 1216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1216" and "system 1216" is used interchangeably herein. A database image may include one or more database objects. A relational database management system (RDMS) or the equivalent may execute storage and retrieval of information against the database object(s). Application platform 1218 may be a framework that allows the applications of system 1216 to run, such as the hardware and/or software, e.g., the operating system. In an embodiment, on-demand database service 1216 may include an application platform 1218 that enables creation, managing and executing one or more applications developed by the provider of the on-demand database service, users accessing the on-demand database service via user systems 1212, or third party application developers accessing the on-demand database service via user systems 1212.

The users of user systems 1212 may differ in their respective capacities, and the capacity of a particular user system 1212 might be entirely determined by permissions (permission levels) for the current user. For example, where a salesperson is using a particular user system 1212 to interact with system 1216, that user system has the capacities allotted to that salesperson. However, while an administrator is using that user system to interact with system 1216, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1214 is any network or combination of networks of devices that communicate with one another. For example, network 1214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1212 might communicate with system 1216 using TCP/IP and, at a higher network level, use other common Internet protocols to communicate, such as HTTP, FTP, AFS, WAP, etc. In an example where HTTP is used, user system 1212 might include an HTTP client commonly referred to as a "browser" for sending and receiving HTTP messages to and from an HTTP server at system 1216. Such an HTTP server might be implemented as the sole network interface between system 1216 and network 1214, but other techniques might be used as well or instead. In some implementations, the interface between system 1216 and network 1214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1216, shown in FIG. 12A, implements a web-based Customer Relationship Management (CRM) system. For example, in one embodiment, system 1216 includes application servers configured to implement and execute CRM software applications as well as provide related data, code, forms, webpages and other information to and from user systems 1212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1216 implements applications other than, or in addition to, a CRM application. For example, system 1216 may provide tenant access to multiple hosted (standard and custom) applications, including a CRM application. User (or third party developer) applications, which may or may not include CRM, may be supported by the application platform 1218, which manages creation, storage of the applications into one or more database objects and executing of the applications in a virtual machine in the process space of the system 1216.

One arrangement for elements of system 1216 is shown in FIG. 12A, including a network interface 1220, application platform 1218, tenant data storage 1222 for tenant data 1223, system data storage 1224 for system data 1225 accessible to system 1216 and possibly multiple tenants, program code 1226 for implementing various functions of system 1216, and a process space 1228 for executing MTS system processes and tenant-specific processes, such as running applications as part of an application hosting service. Additional processes that may execute on system 1216 include database indexing processes.

Several elements in the system shown in FIG. 12A include conventional, well-known elements that are explained only briefly here. For example, each user system 1212 may include a desktop personal computer, workstation, laptop, PDA, cell phone, or any wireless access protocol (WAP) enabled device or any other computing device capable of interfacing directly or indirectly to the Internet or other network connection. User system 1212 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 1212 to access, process and view information, pages and applications available to it from system 1216 over network 1214. Each user system 1212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1216 or other systems or servers. For example, the user interface device may be used to access data and applications hosted by system 1216, and to perform searches on stored data, and otherwise allows a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 1212 and all of its components are operator configurable using applications, such as a browser, including computer code run using a central processing unit such as an Intel Pentium® processor or the like. Similarly, system 1216 (and additional instances of an MTS, where more than one is present) and all of their components might be operator configurable using application(s) including computer code to run using a central processing unit such as processor system 1217, which may include an Intel Pentium® processor or the like, and/or multiple processor units.

According to one embodiment, each system 1216 is configured to provide webpages, forms, applications, data and media content to user (client) systems 1212 to support the access by user systems 1212 as tenants of system 1216. As such, system 1216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 12B:
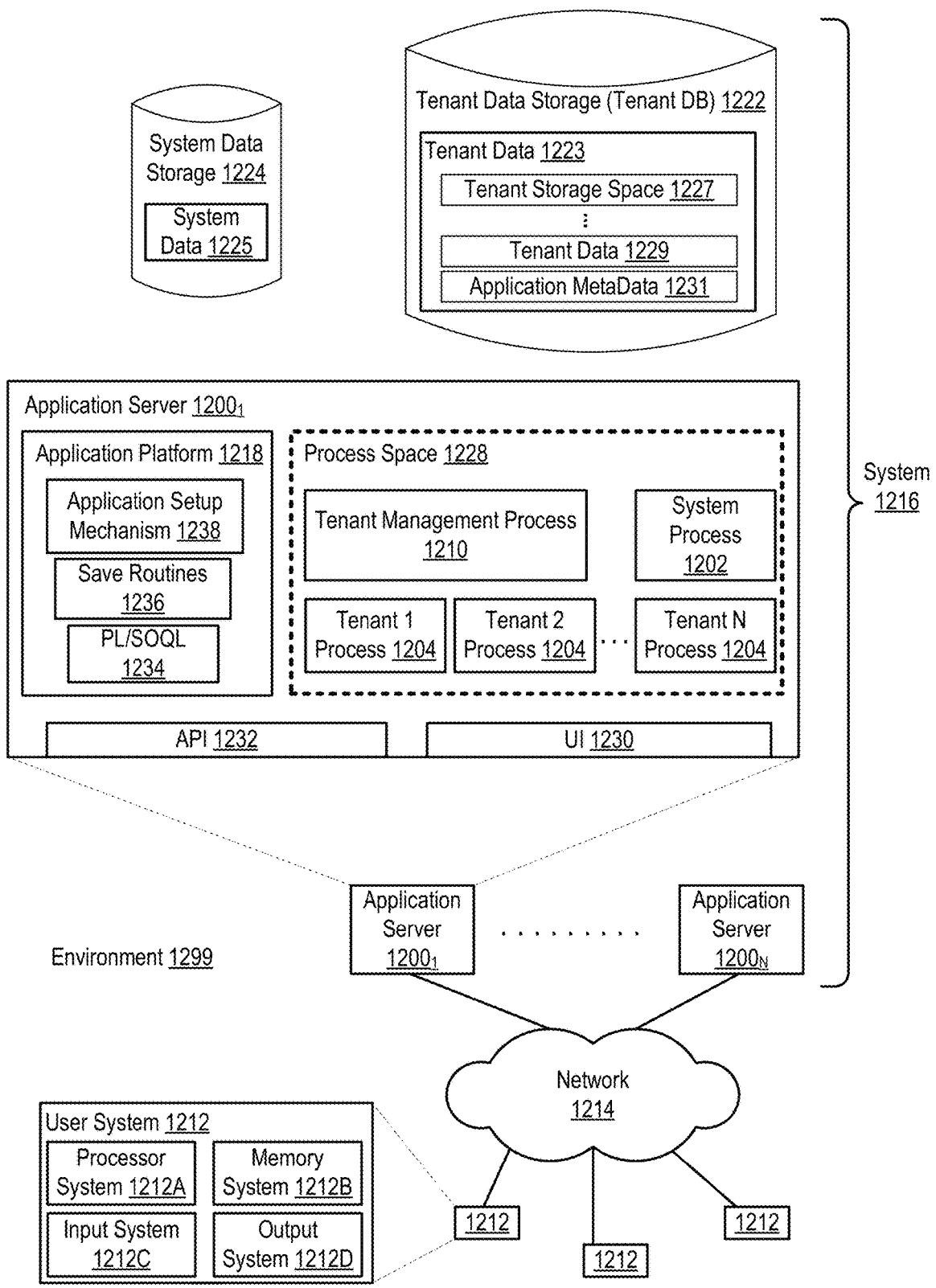
FIG. 12B illustrates another block diagram of an embodiment of elements of FIG. 12A and various possible interconnections between such elements in accordance with described embodiments.

FIG. 12B illustrates another block diagram of an embodiment of elements of FIG. 12A and various possible interconnections between such elements in accordance with the described embodiments. FIG. 12B also illustrates environment 1299. However, in FIG. 12B, the elements of system 1216 and various interconnections in an embodiment are illustrated in further detail. More particularly, FIG. 12B shows that user system 1212 may include a processor system 1212A, memory system 1212B, input system 1212C, and output system 1212D. FIG. 12B shows network 1214 and system 1216. FIG. 12B also shows that system 1216 may include tenant data storage 1222, having therein tenant data 1223, which includes, for example, tenant storage space 1227, tenant data 1229, and application metadata 1231. System data storage 1224 is depicted as having therein system data 1225. Further depicted within the expanded detail of application servers 1200$_{1-N}$ are User Interface (UI) 1230, Application Program Interface (API) 1232, application platform 1218 includes PL/SOQL 1234, save routines 1236, application setup mechanism 1238, process space 1228 includes system process space 1202, tenant 1-N process spaces 1204, and tenant management process space 1210. In other embodiments, environment 1299 may not have the same elements as those listed above and/or may have other elements instead of, or in addition to, those listed above.

User system 1212, network 1214, system 1216, tenant data storage 1222, and system data storage 1224 were discussed above in FIG. 12A. As shown by FIG. 12B, system 1216 may include a network interface 1220 (of FIG. 12A) implemented as a set of HTTP application servers 1200, an application platform 1218, tenant data storage 1222, and system data storage 1224. Also shown is system process space 1202, including individual tenant process spaces 1204 and a tenant management process space 1210. Each application server 1200 may be configured to tenant data storage 1222 and the tenant data 1223 therein, and system data storage 1224 and the system data 1225 therein to serve requests of user systems 1212. The tenant data 1223 might be divided into individual tenant storage areas (e.g., tenant storage space 1227), which may be either a physical arrangement and/or a logical arrangement of data. Within each tenant storage space 1227, tenant data 1229, and application metadata 1231 might be similarly allocated for each user. For example, a copy of a user's most recently used (MRU) items might be stored to tenant data 1229. Similarly, a copy of MRU items for an entire organization that is a tenant might be stored to tenant storage space 1227. A UI 730 provides a user interface and an API 1232 provides an application programmer interface into system 1216 resident processes to users and/or developers at user systems 1212. The tenant data and the system data may be stored in various databases, such as one or more Oracle™ databases.

Application platform 1218 includes an application setup mechanism 1238 that supports application developers' creation and management of applications, which may be saved as metadata into tenant data storage 1222 by save routines 1236 for execution by subscribers as one or more tenant process spaces 1204 managed by tenant management process space 1210 for example. Invocations to such applications may be coded using PL/SOQL 1234 that provides a programming language style interface extension to API 1232. Invocations to applications may be detected by one or more system processes, which manages retrieving application metadata 1231 for the subscriber making the invocation and executing the metadata as an application in a virtual machine.

Each application server 1200 may be communicably coupled to database systems, e.g., having access to system data 1225 and tenant data 1223, via a different network connection. For example, one application server 1200$_1$ might be coupled via the network 1214 (e.g., the Internet), another application server 1200$_{N-1}$ might be coupled via a direct network link, and another application server 1200$_N$ might be coupled by yet a different network connection. Transfer Control Protocol and Internet Protocol (TCP/IP) are typical protocols for communicating between application servers 1200 and the database system. However, it will be apparent to one skilled in the art that other transport protocols may be used to optimize the system depending on the network interconnect used.

In certain embodiments, each application server 1200 is configured to handle requests for any user associated with any organization that is a tenant. Because it is desirable to be able to add and remove application servers from the server pool at any time for any reason, there is preferably no server affinity for a user and/or organization to a specific application server 1200. In one embodiment, therefore, an interface system implementing a load balancing function (e.g., an F5 Big-IP load balancer) is communicably coupled between the application servers 1200 and the user systems 1212 to distribute requests to the application servers 1200. In one embodiment, the load balancer uses a least connections algorithm to route user requests to the application servers 1200. Other examples of load balancing algorithms, such as round robin and observed response time, also may be used. For example, in certain embodiments, three consecutive requests from the same user may hit three different application servers 1200, and three requests from different users may hit the same application server 1200. In this manner, system 1216 is multi-tenant, in which system 1216 handles storage of, and access to, different objects, data and applications across disparate users and organizations.

As an example of storage, one tenant might be a company that employs a sales force where each salesperson uses system 1216 to manage their sales process. Thus, a user might maintain contact data, leads data, customer follow-up data, performance data, goals and progress data, etc., all applicable to that user's personal sales process (e.g., in tenant data storage 1222). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1216 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1216 might also maintain system level data usable by multiple tenants or other data. Such system level data might include industry reports, news, postings, and the like that are sharable among tenants.

In certain embodiments, user systems 1212 (which may be client systems) communicate with application servers 1200 to request and update system-level and tenant-level data from system 1216 that may require sending one or more queries to tenant data storage 1222 and/or system data storage 1224. System 1216 (e.g., an application server 1200 in system 1216) automatically generates one or more SQL statements (e.g., one or more SQL queries) that are designed to access the desired information. System data storage 1224 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 13 illustrates a diagrammatic representation of a machine 1300 in the exemplary form of a computer system, in accordance with one embodiment, within which a set of instructions, for causing the machine/computer system 1300 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1300 includes a processor 1302, a main memory 1304 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1318 (e.g., a persistent storage device including hard disk drives and a persistent database and/or a multi-tenant database implementation), which communicate with each other via a bus 1330. Main memory 1304 includes a blockchain metadata definition manager 1324 and a smart contract executor (e.g., smart contract validator) 1323 and a blockchain interface 1325. Main memory 1304 and its sub-elements are operable in conjunction with processing logic 1326 and processor 1302 to perform the methodologies discussed herein.

Processor 1302 represents one or more general-purpose processing devices such as a microprocessor, central processing unit, or the like. More particularly, the processor 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1302 may also be one or more special-purpose processing devices such as an application specific integrated circuit (ASIC), a field programmable gate array (FPGA), a digital signal processor (DSP), network processor, or the like. Processor 1302 is configured to execute the processing logic 1326 for performing the operations and functionality which is discussed herein.

The computer system 1300 may further include a network interface card 1308. The computer system 1300 also may include a user interface 1310 (such as a video display unit, a liquid crystal display, etc.), an alphanumeric input device 1312 (e.g., a keyboard), a cursor control device 1314 (e.g., a mouse), and a signal generation device 1316 (e.g., an integrated speaker). The computer system 1300 may further include peripheral device 1336 (e.g., wireless or wired communication devices, memory devices, storage devices, audio processing devices, video processing devices, etc.).

The secondary memory 1318 may include a non-transitory machine-readable storage medium or a non-transitory computer readable storage medium or a non-transitory machine-accessible storage medium 1331 on which is stored one or more sets of instructions (e.g., software 1322) embodying any one or more of the methodologies or functions described herein. The software 1322 may also reside, completely or at least partially, within the main memory 1304 and/or within the processor 1302 during execution thereof by the computer system 1300, the main memory 1304 and the processor 1302 also constituting machine-readable storage media. The software 1322 may further be transmitted or received over a network 1320 via the network interface card 1308.

None of the claims in are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A computer-implemented method for validating a transaction request between a plurality of bots in a chatlog via blockchain consensus that executes within a host organization via a plurality of computer systems, each of the plurality of computer systems having at least one processor and one memory therein, wherein the method comprises:
    executing instructions, via the plurality of computer systems, to expose the chatlog to the plurality of computer systems of the host organization;
    automatically provisioning, via the plurality of computer systems, the plurality of bots to interact with the chatlog by permitting transactions to be conducted between the plurality of bots through posts to the chatlog;
    posting, via the plurality of computer systems, the transaction request to the chatlog via a bot among the plurality of bots wherein the transaction request posted to the chatlog by the bot comprises a request to modify at least one operational parameter of at least one of the plurality of computer systems, wherein the at least one operational parameter is selected from the group comprising: (i) modification of computing resources for one of the computer systems, (ii) modification to virtual machines executing at one of the computer systems, (iii) modification to hardware allocations associated with a virtual machine executing at one of the computer systems, (iv) modification to a software configuration of one of the computer systems, (v) modification to a computing state of one of the computer systems, and (vi) modification to computing instances executing at one of the computer systems;
    interpreting, via the plurality of computer systems, the transaction request from the posts to the chatlog using natural language processing;
    writing, via the plurality of computer systems, the interpreted transaction request and an identification of the bot requesting the transaction to a blockchain communicably interfaced with the host organization, wherein the chatlog is stored within a database system of the host organization separate from the blockchain;
    negotiating consensus among the plurality of bots as a respective plurality of nodes on the blockchain corresponding to a blockchain network to conduct the requested transaction;
    when consensus is not reached: (i) dismissing the transaction request via a second bot, (ii) comparing a number of bad attempts by the bot having originated the transaction request with a threshold number of bad attempts within a specified time-period, (iii) pulling the transaction request from the chatlog via the second bot, (iv) posting dismissal of the transaction request to the chatlog via the second bot, (v) automatically ejecting the bot having requested the transaction from the blockchain network after the threshold number of bad attempts is attained by the bot having originated the transaction request within the specified time-period, and (vi) prohibiting any bot among the plurality of bots from reporting the transaction request that was dismissed and pulled from the chatlog; and
    when consensus is reached, performing the following operations by the second bot: (i) writing the transaction to the blockchain, (ii) pulling the transaction request from the chatlog, (iii) conducting the transaction, and (iv) posting completion of the transaction to the chatlog.

2. The method of claim 1,
    wherein posting the transaction request to the chatlog via the bot among the plurality of bots comprises a monitoring bot posting the transaction request to the chatlog; and
    wherein pulling the transaction request from the chatlog via the second bot and conducting the transaction via the second bot comprises the second bot operating as a deployment bot pulling the transaction request from the chatlog, and the second bot operating as the deployment bot conducting the transaction.

3. The method of claim 1, further comprising:
    each of the plurality of bots reading the chatlog;
    applying, via the plurality of computer systems, the natural language processing to the chatlog; and
    interpreting, via the plurality of computer systems, one or more commands from the transaction request posted to the chatlog based on the natural language processing.

4. The method of claim 1, wherein negotiating consensus among the plurality of bots as the respective plurality of nodes on the blockchain corresponding to the blockchain network to conduct the requested transaction further comprises negotiating consensus among the plurality of bots as nodes on the blockchain as to one of:
the identity and authority of the bot of the plurality of bots requesting the transaction; and
the identity and authority of the bot of the plurality of bots to write the transaction request to the blockchain.

5. The method of claim 1, further comprising:
when consensus is not reached, initially isolating or quarantining the bot having requested the transaction when a number of bad attempts by the bot having requested the transaction exceeds a threshold number of bad attempts within a specified time-period; and
subsequently ejecting the node from the blockchain that corresponds to the bot having originated the transaction request.

6. The method of claim 1, wherein the isolating or the quarantining of the bot of the plurality of bots requesting the transaction comprises prohibiting the bot of the plurality of bots requesting the transaction from one of:
posting transaction requests to the chatlog;
writing transaction requests to the blockchain;
pulling transaction requests from the chatlog; and
conducting transactions.

7. The method of claim 1:
wherein each of the plurality of bots controls a respective one of the plurality of computer systems or a virtual machine executing at the respective one of the plurality of computer systems; and
wherein conducting transactions between the plurality of bots comprises conducting transactions to modify operational parameters between two or more of the plurality of computer systems or between two or more virtual machines executing on any of the plurality of computer systems respectively controlled via the plurality of bots.

8. The method of claim 1, wherein at least two of the plurality of bots are functionally redundant and control operational parameters for the at least one of the plurality of computer systems that are functionally redundant or at least one of the virtual machines executing on any of the plurality of computer systems that are functionally redundant.

9. The method of claim 1, further comprising:
periodically writing to the blockchain a hash of a current state of operational parameters for the at least one of the plurality of computer systems or at least one of the virtual machines executing on any of the plurality of computer systems respectively controlled by the plurality of bots; and
wherein negotiating consensus among the plurality of bots to conduct the requested transaction comprises denying approval or consensus among the plurality of bots to conduct the requested transaction when at least one of the plurality of bots fails to approve the requested transaction based on a difference in the blockchain detected by the at least one of the bots regarding the hash of the current state of operational parameters written to the blockchain.

10. The method of claim 9, wherein negotiating consensus among the plurality of bots to conduct the requested transaction further comprises achieving consensus among the plurality of bots to conduct the requested transaction when a threshold number of the plurality of bots approve the requested transaction based on a match in the blockchain detected among the plurality of bots regarding the hash of the current state of operational parameters written to the blockchain.

11. The method of claim 9, wherein negotiating consensus among the plurality of bots to conduct the requested transaction further comprises achieving consensus among the plurality of bots to conduct the requested transaction when a threshold number of the plurality of bots approve the requested transaction based on one of:
a type associated with the transaction request;
a priority of the transaction request;
a criticality score of the transaction request;
a transaction value specified by the transaction request;
an identity of the computer system or virtual machine corresponding to the bot of the plurality of bots having posted the transaction request;
a hardware configuration of the computer system or virtual machine corresponding to the bot of the plurality of bots having posted the transaction request;
software parameters of the computer system or virtual machine corresponding to the bot of the plurality of bots having posted the transaction request;
a host organization that provides cloud services having originated the transaction request;
a cloud computing platform having originated the transaction request;
a cloud development environment having originated the transaction request; and
a cloud based sandbox environment having originated the transaction request.

12. Non-transitory computer readable storage media having instructions stored thereon that, when executed via a plurality of computer systems at a host organization, each of the plurality of computer systems having at least one processor and one memory therein, the instructions cause the plurality of computer systems to validate a transaction request between a plurality of bots in a chatlog via blockchain consensus, via the following operations:
executing instructions, via the plurality of computer systems to expose the chatlog to the plurality of computer systems of the host organization;
automatically provisioning the plurality of bots to interact with the chatlog by permitting transactions to be conducted between the plurality of bots through posts to the chatlog;
posting the transaction request to the chatlog via a bot among the plurality of bots wherein the transaction request posted to the chatlog by the bot comprises a request to modify at least one operational parameter of at least one of the plurality of computer systems, wherein the at least one operational parameter is selected from the group comprising: (i) modification of computing resources for one of the computer systems, (ii) modification to virtual machines executing at one of the computer systems, (iii) modification to hardware allocations associated with a virtual machine executing at one of the computer systems, (iv) modification to a software configuration of one of the computer systems, (v) modification to a computing state of one of the computer systems, and (vi) modification to computing instances executing at one of the computer systems;
interpreting the transaction request from the posts to the chatlog using natural language processing;
writing the interpreted transaction request and an identification of the bot requesting the transaction to a blockchain communicably interfaced with the host organization, wherein the chatlog is stored within a database system of the host organization separate from the blockchain;

negotiating consensus among the plurality of bots as a respective plurality of nodes on the blockchain corresponding to a blockchain network to conduct the requested transaction;

when consensus is not reached: (i) dismissing the transaction request via a second bot, (ii) comparing a number of bad attempts by the bot having originated the transaction request with a threshold number of bad attempts within a specified time-period, (iii) pulling the transaction request from the chatlog via the second bot, (iv) posting dismissal of the transaction request to the chatlog via the second bot, (v) automatically ejecting the bot having requested the transaction from the blockchain network after the threshold number of bad attempts is attained by the bot having originated the transaction request within the specified time-period, and (vi) prohibiting any bot among the plurality of bots from reporting the transaction request that was dismissed and pulled from the chatlog; and when consensus is reached, performing the following operations by the second bot: (i) writing the transaction to the blockchain, (ii) pulling the transaction request from the chatlog, (iii) conducting the transaction, and (iv) posting completion of the transaction to the chatlog.

13. The non-transitory computer readable storage media of claim 12:

wherein posting the transaction request to the chatlog via the bot among the plurality of bots comprises a monitoring bot posting the transaction request to the chatlog; and wherein pulling the transaction request from the chatlog via the second bot and conducting the transaction via the second bot comprises the second bot operating as a deployment bot pulling the transaction request from the chatlog, and the second bot operating as the deployment bot conducting the transaction.

14. The non-transitory computer readable storage media of claim 12, wherein negotiating consensus among the plurality of bots as the respective plurality of nodes on the blockchain corresponding to the blockchain network to conduct the requested transaction further comprises negotiating consensus among the plurality of bots as nodes on the blockchain as to one of:

the identity and authority of the bot of the plurality of bots requesting the transaction; and the identity and authority of the bot of the plurality of bots to write the transaction request to the blockchain.

15. The non-transitory computer readable storage media of claim 12, further comprising, when consensus is not reached, isolating or quarantining the bot of the plurality of bots requesting the transaction, wherein isolating the bot of the plurality of bots requesting the transaction comprises prohibiting the one of the plurality of bots requesting the transaction from one of:

posting transaction requests to the chatlog;
writing transaction requests to the blockchain;
pulling transaction requests from the chatlog; and
conducting transactions.

16. An integrated plurality of computer systems executed by a host organization for validating a transaction request between a plurality of bots in a chatlog via blockchain consensus, wherein each of the integrated plurality of computer systems comprises:

a memory to store instructions;
at least one processor to execute the instructions;
wherein the integrated plurality of computer systems are configurable to execute the instructions via the at least one processor to perform operations including:

executing instructions, via the integrated plurality of computer systems to expose the chatlog to the integrated plurality of computer systems of the host organization;

automatically provisioning the plurality of bots to interact with the chatlog by permitting transactions to be conducted between the plurality of bots through posts to the chatlog;

posting the transaction request to the chatlog via a bot among the plurality of bots wherein the transaction request posted to the chatlog by the bot comprises a request to modify at least one operational parameter of at least one of the plurality of computer systems, wherein the at least one operational parameter is selected from the group comprising: (i) modification of computing resources for one of the computer systems, (ii) modification to virtual machines executing at one of the computer systems, (iii) modification to hardware allocations associated with a virtual machine executing at one of the computer systems, (iv) modification to a software configuration of one of the computer systems, (v) modification to a computing state of one of the computer systems, and (vi) modification to computing instances executing at one of the computer systems;

interpreting the transaction request from the posts to the chatlog using natural language processing;

writing the interpreted transaction request and an identification of the bot requesting the transaction to a blockchain communicably interfaced with the host organization, wherein the chatlog is stored within a database system of the host organization separate from the blockchain;

negotiating consensus among the plurality of bots as a respective plurality of nodes on the blockchain corresponding to a blockchain network to conduct the requested transaction;

when consensus is not reached: (i) dismissing the transaction request via a second bot, (ii) comparing a number of bad attempts by the bot having originated the transaction request with a threshold number of bad attempts within a specified time-period, (iii) pulling the transaction request from the chatlog via the second bot, (iv) posting dismissal of the transaction request to the chatlog via the second bot, (v) automatically ejecting the bot having requested the transaction from the blockchain network after the threshold number of bad attempts is attained by the bot having originated the transaction request within the specified time-period, and (vi) prohibiting any bot among the plurality of bots from reporting the transaction request that was dismissed and pulled from the chatlog; and when consensus is reached, performing the following operations by the second bot: (i) writing the transaction to the blockchain, (ii) pulling the transaction request from the chatlog, (iii) conducting the transaction, and (iv) posting completion of the transaction to the chatlog.

17. The system of claim 16:

wherein posting the transaction request to the chatlog via the bot among the plurality of bots comprises a monitoring bot posting the transaction request to the chatlog; and wherein pulling the transaction request from the chatlog via the second bot and conducting the transaction via the second bot comprises the second bot operating as a deployment bot pulling the transaction request from the chatlog, and the second bot operating as the deployment bot conducting the transaction.

18. The system of claim 16, wherein negotiating consensus among the plurality of bots as the respective plurality of nodes on the blockchain corresponding to the blockchain network to conduct the requested transaction further comprises negotiating consensus among the plurality of bots as nodes on the blockchain as to one of:

- the identity and authority of the bot of the plurality of bots requesting the transaction; and
- the identity and authority of the bot of the plurality of bots to write the transaction request to the blockchain.

* * * * *